(12) United States Patent
Srikanteswara et al.

(10) Patent No.: US 12,363,205 B2
(45) Date of Patent: Jul. 15, 2025

(54) STORAGE NODE RECRUITMENT IN AN INFORMATION CENTRIC NETWORK

(71) Applicant: Intel Corporation, Santa Clara, CA (US)

(72) Inventors: Srikathyayani Srikanteswara, Portland, OR (US); Marcin Spoczynski, Leixlip (IE); Yi Zhang, Portland, OR (US); Hao Feng, Hillsboro, OR (US); Kshitij Arun Doshi, Tempe, AZ (US); Francesc Guim Bernat, Barcelona (ES); Ned M. Smith, Beaverton, OR (US); Satish Chandra Jha, Portland, OR (US); S M Iftekharul Alam, Hillsboro, OR (US); Vesh Raj Sharma Banjade, Portland, OR (US); Alexander Bachmutsky, Sunnyvale, CA (US); Nageen Himayat, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 782 days.

(21) Appl. No.: 17/484,134

(22) Filed: Sep. 24, 2021

(65) Prior Publication Data

US 2022/0014450 A1      Jan. 13, 2022

(51) Int. Cl.
*H04L 67/63*       (2022.01)
*H04L 41/5019*    (2022.01)
*H04L 45/02*       (2022.01)

(52) U.S. Cl.
CPC .......... *H04L 67/63* (2022.05); *H04L 41/5019* (2013.01); *H04L 45/02* (2013.01)

(58) Field of Classification Search
CPC ..... H04L 41/5019; H04L 45/02; H04L 67/63; G06F 16/00
See application file for complete search history.

(56) References Cited

U.S. PATENT DOCUMENTS

| | | | |
|---|---|---|---|
| 2013/0182568 A1* | 7/2013 | Lee | H04L 47/31 370/231 |
| 2015/0117253 A1 | 4/2015 | Scott et al. | |
| 2016/0094439 A1* | 3/2016 | Ravindran | H04L 45/306 709/238 |
| 2017/0134276 A1* | 5/2017 | White | H04L 67/5681 |
| 2021/0194800 A1* | 6/2021 | Bosshart | H04L 45/38 |
| 2022/0200871 A1* | 6/2022 | Ponnuswamy | G06F 18/214 |

OTHER PUBLICATIONS

"European Application Serial No. 22191414.6, Extended European Search Report mailed Dec. 21, 2022", 9 pgs.

* cited by examiner

*Primary Examiner* — Tejis Daya
(74) *Attorney, Agent, or Firm* — Schwegman Lundberg & Woessner, P.A.

(57) ABSTRACT

System and techniques for storage node recruitment in an information centric network (ICN) are described herein. An ICN node receives a storage interest packet that includes an indication differentiating the storage interest from other ICN interests. The ICN node forwards the storage interest packet and receives a storage data packet in response. Here, the storage data packet includes an indication that the storage data packet is not to be cached along with node information for a node that created the storage data packet. The ICN node may then transmit the storage data packet in accordance with a pending interest table (PIT) entry corresponding to the storage interest packet.

28 Claims, 16 Drawing Sheets

STORAGE NODE RECRUITMENT IN AN INFORMATION CENTRIC NETWORK

TECHNICAL FIELD

Embodiments described herein generally relate to computer networking and more specifically to storage node recruitment in an information centric network (ICN).

BACKGROUND

Information centric networks (ICNs) implement protocols and mechanisms where communications between machines for information or computational services are specified by name. This is in contrast to traditional (legacy) networks and protocols in which communications include addresses (e.g., and ports) of specific end-points (e.g., a host Internet Protocol (IP) address). In ICN operations, an interest packet (e.g., request) arrives at an ICN node. The interest packet includes a name for the requested content. If the content happens to be in content store (CS) (e.g., local cache) of the ICN node, the interest is satisfied with the data from the CS. To satisfy the interest, the ICN node transmits a data packet including the content out of the interface (e.g., face) from which the interest was received. If the content is not in the CS, the incoming interest is recorded in a pending interest table (PIT) along with information about the requestor (e.g., incoming face). The interest, if not already in the PIT (e.g., due to some other requestor), represents a new need to seek the requested data from some other node. Accordingly, the ICN node consults a Forwarding information base (FIB) to route the interest forward neighbor ICN nodes. In this way, interests navigate to the nearest node that has the requested data in its content store, or to an original publisher. When the data packet in response to the interest traverses back to the original requester, the intervening PIT entries are used to find the route, akin to following a trail of breadcrumbs, and the data may be cached at each node the data packet traverses.

Edge computing places computing resources close to consumers of services in order to, for example, meet ultra-low latency requirements of these services. Accordingly, compute servers are often situated in close physical proximity to data sources. For example, servers may be situated in cellular base stations These kinds of operating environments are often unique because they are resource constrained environments. The resource constraints may include processing or storage limitations, as well as power. Often mains power (e.g., power provided by a commercial grid operator) is unavailable, and so battery or ambient power generation (e.g., wind or solar) power may be used. Ambient and battery power may fluctuate in time and the power use of applications running at the edge (e.g., demand for edge services) may also fluctuate in time.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The exponential growth of data in various industries has increased storage demands. Traditional cloud storage may have difficulty meeting latency, cost, flexibility, or resiliency requirements of this demand. Accordingly, more and more data is received, processed, generated, consumed, and stored in edge networks. As need for storage increases at the edge, it is normal to try and recruit edge devices for storage. However, it is challenging to provide reliable and resilient services using unreliable dynamic edge devices. It is also challenging to recruit third party (e.g., controlled by another) mobile or other client devices to provide storage services.

Some techniques to overcome storage node recruitment have been attempted, such as Ceph, which provides a framework over the Internet Protocol (IP) that provides distributed storage. ICN (e.g., named data network (NDN)) based techniques, such as the Open Storage System plug-in for XRootD, integrate named data network (NDN)—a flavor of ICN—with existing content management systems (CMS) to provide distributed caching of data via NDN router nodes. However, these techniques do not address resiliency issues when faced with events that may corrupt cached data, misdirect, inject, or replace interest packets.

To address these issues an ICN-based storage framework is described below. This framework leverages pervasive edge nodes—such as laptops, vehicles, smart phones, etc.—to improve the storage efficiency and resiliency by maintaining redundant data using ICN caching. The described techniques enable increases edge storage. This is beneficial when there are sudden or unexpected events that increase the need for storage at the edge. Typically, planned storage is designed to cover steady state needs and not bursts of increased requirements. As more devices request compute at the edge, more robust storage to support these devices will be requested. The techniques described herein discover and use storage that is already present at the edge. Further, techniques to hand over storage if a device will no longer be available, recover data if a storage node fails, or reclaim storage resources if storage needs change in unpredictable way—such as failure of initiator—are also described. This may result in greatly lowered storage costs as users participating in the distributed storage system may benefit from close storage when the device participates. In an example, quality of service (QoS), reliability, or security metrics may be included as part of an attested mesh of ICN nodes where participation in the mesh is predicated on successful attestation by the community of previously accepted nodes. Additional details and examples are provided below.

Figure 1:
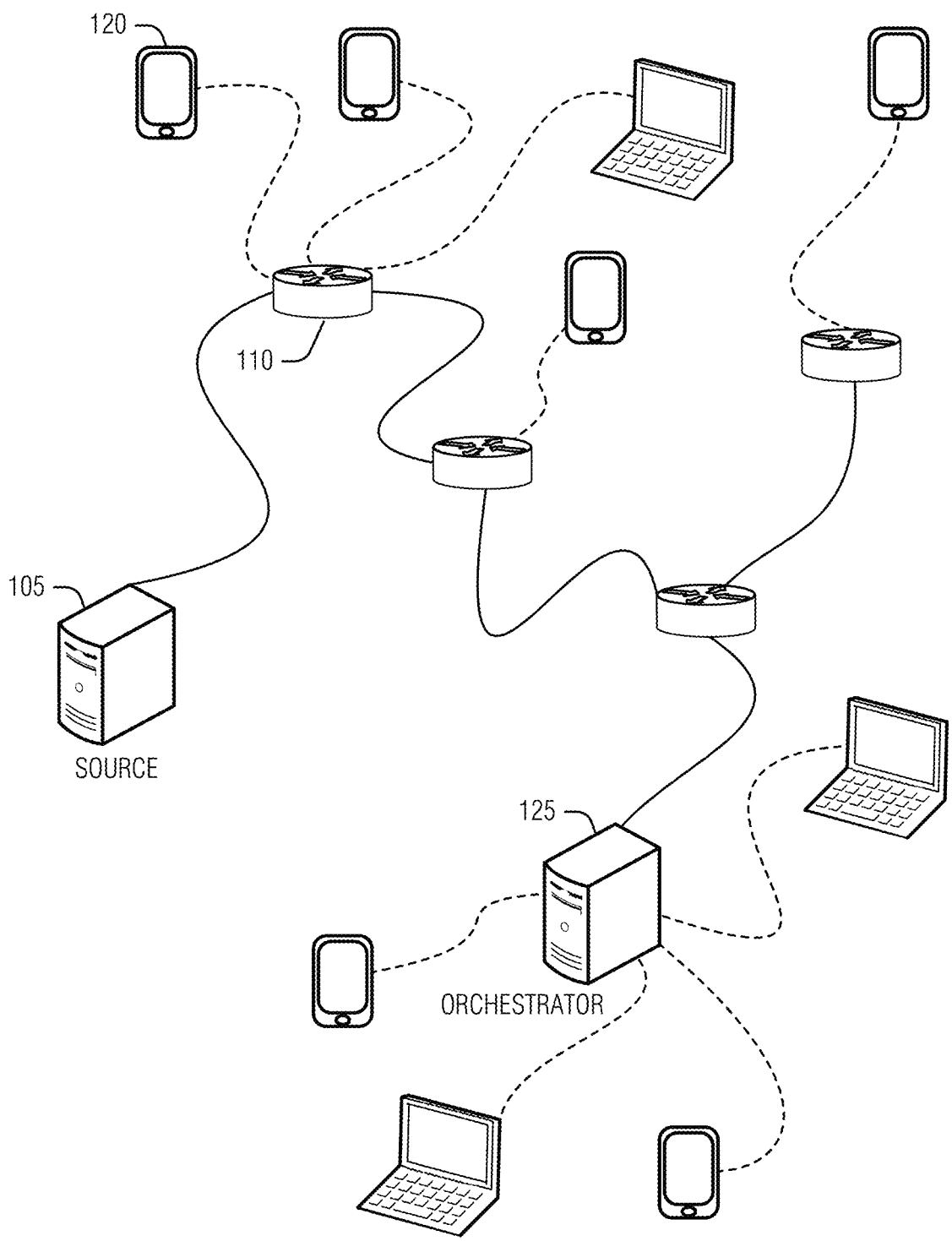
FIG. 1 is a block diagram of an example of an environment including a system for storage node recruitment in an ICN, according to an embodiment.

FIG. 1 is a block diagram of an example of an environment including a system for storage node recruitment in an ICN, according to an embodiment. The solid lines indicate connections between ICN router nodes (e.g., ICN nodes), such as the ICN node 110, and the dashed lines indicate connections to edge devices, such as edge device 120. The source 105 is a device that is requesting storage. To illustrate storage node recruitment, the configuration and operations of the ICN node 110 are described.

Figure 3:
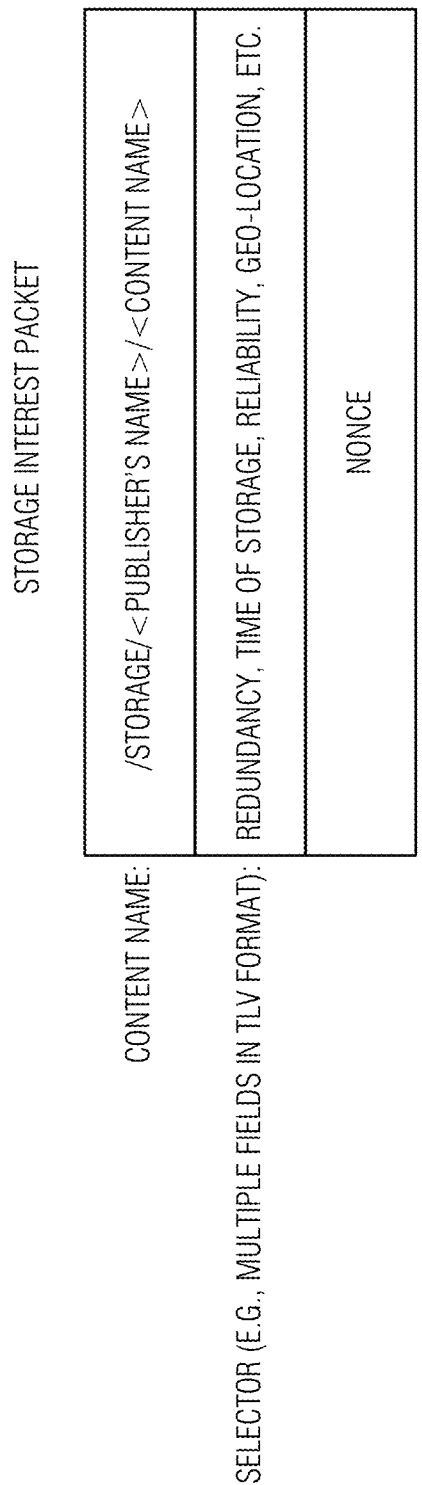
FIG. 3 illustrates an example of a storage interest packet, according to an embodiment.
Figure 11A:
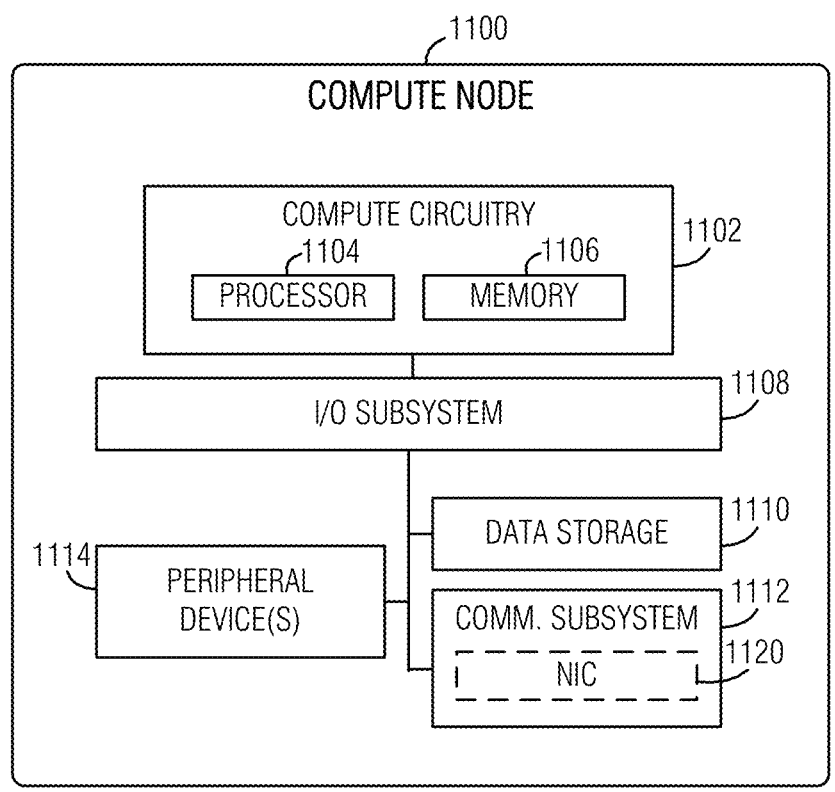
FIG. 11A provides an overview of example components for compute deployed at a compute node in an edge computing system.
Figure 11B:
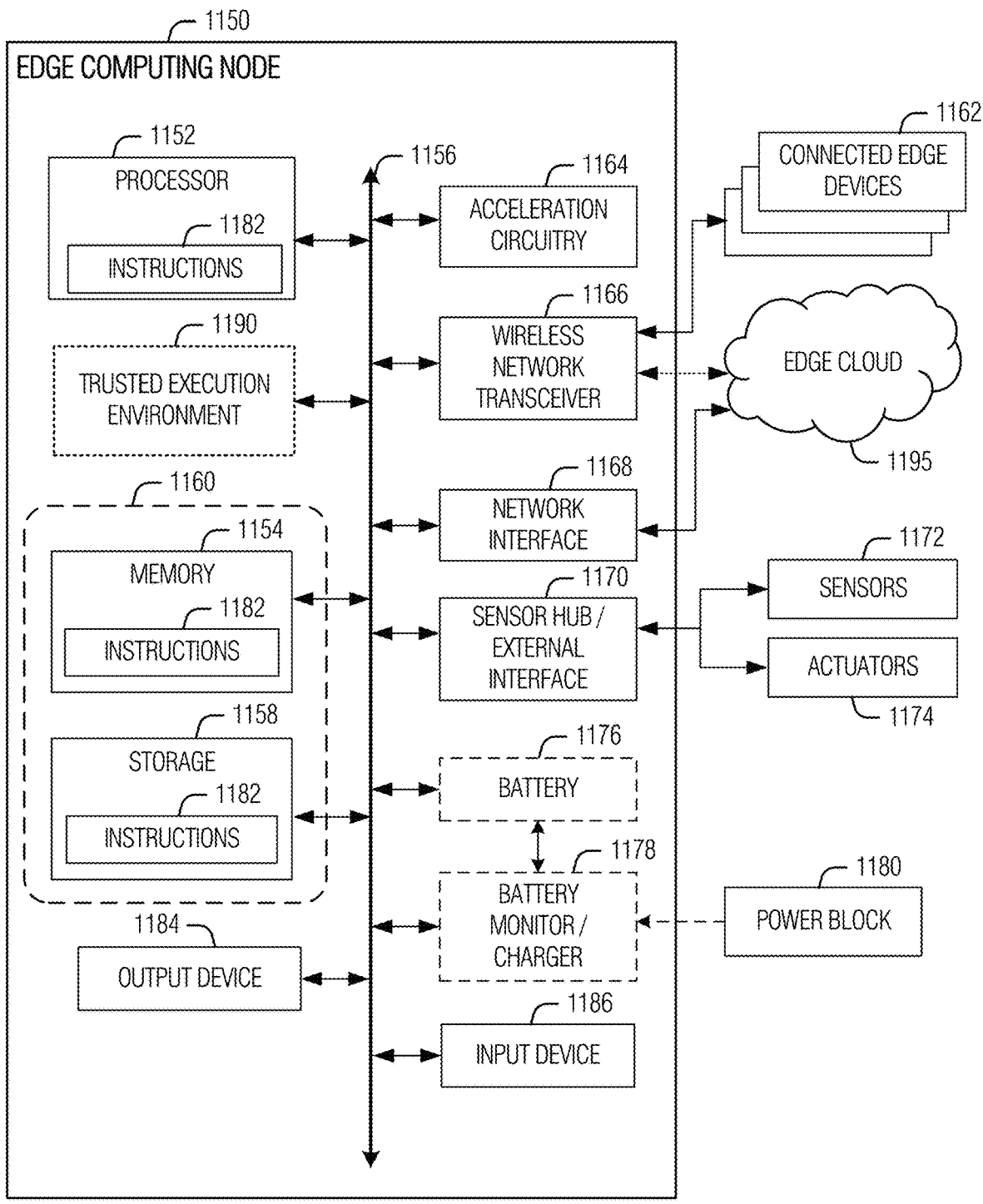
FIG. 11B provides a further overview of example components within a computing device in an edge computing system.
Figure 15:
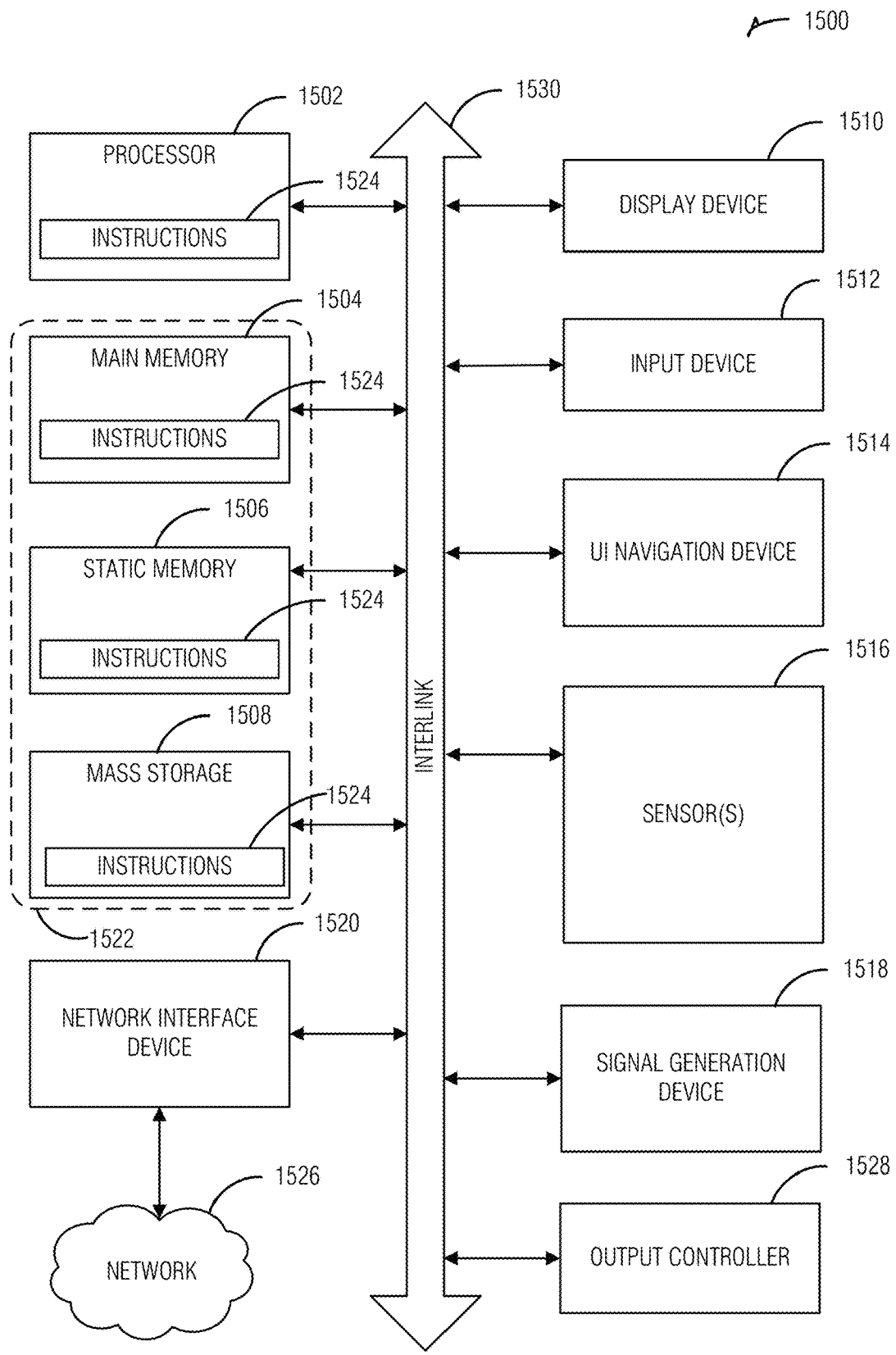
FIG. 15 is a block diagram illustrating an example of a machine upon which one or more embodiments may be implemented.

The ICN node 110—which may conform to the node 1150 illustrated in FIG. 11B, machine 1500 illustrated in FIG. 15, among others—includes processing circuitry that is arranged—e.g., configured by design (e.g., hardwired) or software (e.g., firmware, scripts, executables, etc.) to receive a storage interest packet, for example, from the source 105. Here, the storage interest packet includes an indication differentiating the storage interest from other ICN interests. For example, a flag (e.g., bit) may be used to differentiate the storage interest from other interest packets, or a name prefix may be used (e.g., as illustrated in FIG. 3).

In an example, the storage interest packet includes a set of selectors. Here, the set of selectors are used by nodes (such as edge node 120) to determine storage requirements for data indicated in the storage interest packet. These storage requirements may simply be the amount of storage requested, but may also include security—such as encryption, trusted computing platform support, etc.—latency, redundancy, connectivity, geographical area constraints, or other requirements. Thus, in an example, the set of selectors include a platform requirement, security requirement, an integrity requirement, a storage requirement, or a transformation requirement. In an example, the storage requirement restricts the data to a geographic area. In an example, the platform requirement enforces minimum performance of components. This performance may be measured in latency, bandwidth, timing, or other performance metrics.

In an example, the transformation requirement defines what transformations to the data are acceptable during storage. In an example, compression or encryption are transformations to the data. Restricting transformations may operate to ensure the security or integrity of the data. For example, if compression is lossy (e.g., some data is lost when the data is decompressed) a restriction may preserve the integrity of the data. However, if lossy compression is permitted, more edge nodes may be able to service the storage request.

The processing circuitry of the ICN node 110 is arranged to forward the storage interest packet. The forwarding may proceed in the manner typically performed by ICNs. This includes creating an entry in the ICN node's pending interest table (PIT) to recording the inbound interface (e.g., in-face) on which the storage interest packet was received.

The processing circuitry of the ICN node 110 is arranged to receive a storage data packet in response to the storage interest packet. Here, the storage data packet includes an indication that the storage data packet is not to be cached and thus deviates from traditional ICN data packet handling. The storage data packet is created by a node, such as the edge node 120, to indicate an ability to participate in the storage of data specific in the storage interest packet. Thus, the storage data packet includes node information for the node (e.g., edge node 120) that created the storage data packet. In an example, where the storage interest packet includes a set of selectors, the node that created the storage data packet (e.g., the edge node 1200) met the storage requirements. This example acknowledges that the edge node 120 is arranged to extract the selectors and ensure that it conforms to requirements in those selectors. If the edge node 120 does not meet the requirements in the selectors, the edge node 120 will not create and send a storage data packet.

The processing circuitry of the ICN node 110 is arranged to transmit the storage data packet in accordance the PIT entry corresponding to the storage interest packet. Thus, the ICN node 110 operates like a traditional ICN, forwarding the storage data packet back to the source 105.

In an example, the processing circuitry of the ICN node 110 is arranged to determine that the ICN node 110 has resources that satisfy the storage interest packet. In this example, the ICN node 110 is acknowledging that it meets any requirements included in the storage interest packet, such as defined by selectors. The processing circuitry is arranged to create a second storage data packet (second to the storage data packet from the edge node 120) that includes information about the ICN node 110. This second data packet is transmitted in accordance with the PIT entry. Here, the PIT entry may deviate from traditional ICN PIT entries by being sticky. Sticky, in this context, means that the PIT entry is not removed when a first data packet matching the PIT entry is encountered. Rather, the PIT entry "sticks" until a removal condition is met. In an example, the removal condition is time, such that, after a timer period has elapsed since the storage interest packet was received, the PIT entry is expunged. In an example, the removal condition is a number of data packets. This number may be specified in the storage interest packet. Here, once the number of data packets have been received by the ICN node 110, the PIT entry is removed.

In an example, when the ICN node 110 created the second interest packet to participate in the storage request, the processing circuitry of the ICN node 110 is arranged to transmit an interest packet for data identified in the storage interest packet through an interface used to receive the storage interest packet. In this example, which may be employed by the edge node 120 as well, an interest packet is sent to the source 105 to actually request the data. Thus, the first interest-data packet exchange alerts the source as to nodes' willingness to participate in the storage request. This second interest, which is not a storage interest, requests the data named in the storage interest to move that data to a local replica.

In an example, the processing circuitry of the ICN node 110 is arranged to that a node (e.g., the edge node 120) in a cluster—to which the ICN node 110 belongs—has resources that satisfy the storage interest packet. Here, the ICN node 110 may create a second storage data packet that includes information about the node in the cluster and transmit the second storage data packet in accordance with the PIT entry. In an example, the ICN node 110 periodically communicates with nodes in the cluster to obtain node information including the information about the node in the cluster. In an example, the ICN node 110 is a cluster head organizing storage interest packets and storage data packets for the cluster. The orchestrator 125 is an example of a cluster head. The cluster head 125 may operate to insulate other members of the cluster from the storage interest packets. In this example, storage interest packets are handled exclusively by the cluster head 125. In an example, members of the cluster elect one or more cluster heads to be the cluster head.

Figure 4:
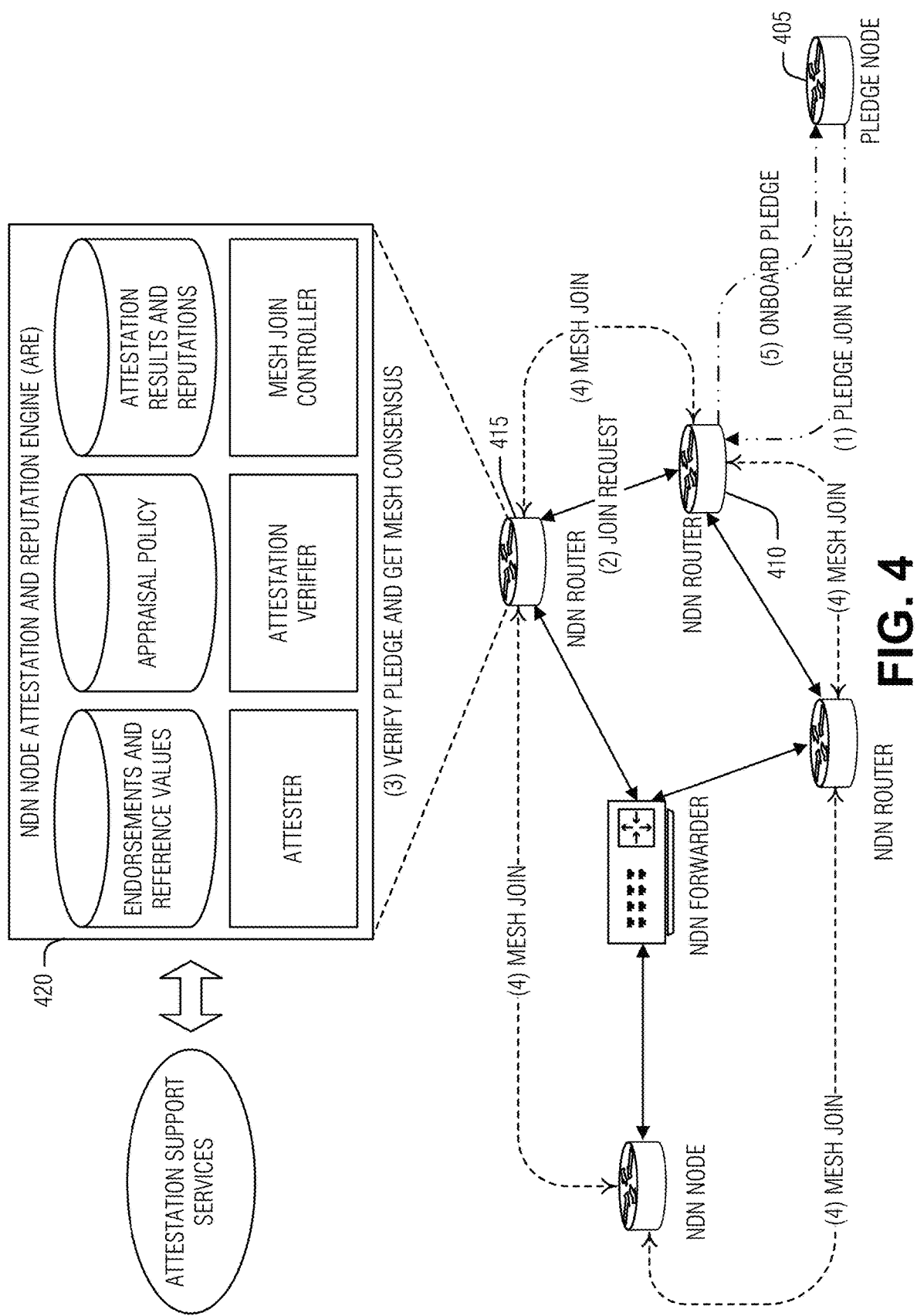
FIG. 4 illustrates an example of a system to join nodes to an ICN using attestation, according to an embodiment.

In an example, the ICN node 110 is part of an ICN network, where the ICN node 110 passed an attestation process to join the ICN network. In an example, the attestation process includes pledging the ICN network including providing attestation evidence and being onboarded after a verifier of the ICN network receives endorsements or reference values of the attestation evidence from other nodes of the ICN network. An example of this is illustrated in FIG. 4 and described below.

Figure 2:
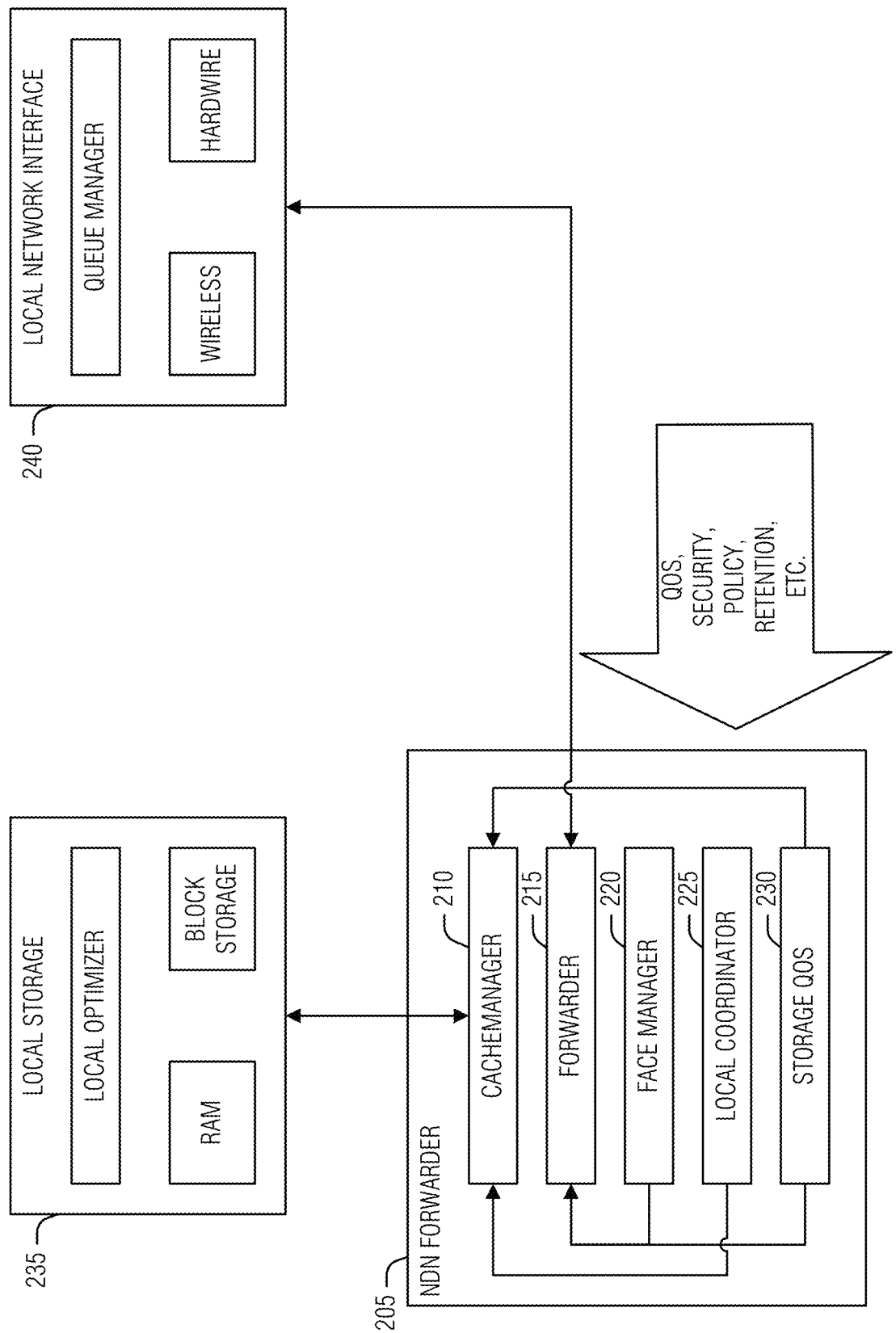
FIG. 2 illustrates an example of components in an ICN node, according to an embodiment.

FIG. 2 illustrates an example of components in an ICN node, according to an embodiment. As illustrated, ICN nodes include local storage 235, a network interface 240, and forwarding circuitry 205. The forwarding circuitry 205 may include a cache manager 210 to manage the local storage 235, a forwarder 215 to transmit packets through the network interface 240, a face manager 220 to manage network interfaces, a local coordinator 225 to manage resources on the ICN node, and a storage QoS manager 230 to ensure that data kept in the local storage is properly stored.

In an example, the forwarder 215 is arranged to manage forwarding, discovering, caching, and routing of data. In an example, the face manager 220 is arranged to create or configure software interfaces between applications. In an example, the storage QoS manager 230 is arranged to enforce storage policies, such as retention, memory available for storage, storage, or network queue configurations, etc. In an example, the cache manager 210 is arranged to manage local storage resources, such as translating QoS parameters to the platform knobs. In an example, the local coordinator 225 is arranged to coordinate data or configurations between multiple nodes, such as replications or data availability.

A device desiring additional storage sends out a storage interest packet—e.g., with "/storage" in the name—to indicate it is a special type of interest packet that identifies it as a request for finding storage services and not for content or compute. An indication in the storage interest packet for resilient storage may further inform the ICN to replicate data according to resiliency policies. For example, nodes of the ICN are directed to replicate the data across diverse geographies. In an example, a reference count of replicas may be used to ensure a low water mark redundancy exists within the ICN. In an example, replication to hardened storage resources is directed.

The storage interest packet may contain the name of the content, the size of the content, or other requirements such as the type of storage node, security requirements, or geographical requirements, among others. The storage interest packet may contain a minimum number of nodes necessary to replicate data.

In an example, a resilient storage strategy may be included in the storage interest packet and include metrics for durability, reliability, recovery, integrity protection, privacy etc. Here, nodes with differing metrics may be assured that there is a stricter strategy in place that covers less strict metrics. The resilient storage strategy—or more than one strategy—may specify the number of computers, size of available storage, or link connections to inform optimization strategies at the edge. Local operators may augment or influence these strategies transparently or opaquely, but not in a way that is less strict than the requestor's desired strategy.

In an example, the storage interest packet includes a field for the "time of storage" to track a particular resource's utilization over time. If not so marked, data may be stored indefinitely or until the requesting node indicates that the data may be removed. For data stored indefinitely, the storing node may periodically, based on configuration, request renewal of time-of-storage mark. The storing node configuration may force a storage purge if such renewal has not been received in the defined period of time that may happen if the node that requested storage does not exist anymore. A storage purge decision may be followed by a corresponding message to the control and management layer, such as to a cluster manager, or known data replicas directly to notify that a particular copy of the stored data is targeted to be deleted, which may trigger either data transfer to another node or storage purge of all copies of the stored data. However, with the time-of-storage mark, a storage strategy may indicate how the storage node handles stored data after the time-of-storage expires. For example, storage nodes may delete, forward, return, move to archive storage, the data or return it to a traditional ICN content status.

Once the interest packet reaches a node with storage (e.g., node-A), the node will send a data packet back acknowledging that the node is willing to store the data and provide information about the node. In an example, node-A then sends an interest packet for the data, which is sent to node-A. In an example, node-A may indicate how long node-A is able to store the data. In an example, an NDN forwarding Daemon (NFD)—or other ICN implementation component—is modified such that the data packets sent in response to a storage request are not cached in the intermediate nodes.

In an example, node-A then forwards the storage interest packet after reducing the number of nodes for which storage is needed by one. The storage interest packet may then be picked up by other storage nodes.

In an example, the number of nodes storing data (e.g., total nodes participating in a data storage request) may be limited by refusing, by the original requestor, interest packets from storage nodes to acquire the data after a certain number of responses have been sent. In an example, a storage node initial data acknowledgment (ACK) packet may indicate a publication name, enabling intermediate nodes to track unique responses and stop forwarding of the storage interest packet, storage data packets in response to the storage interest packet, or interest packets requesting the data.

In an example, if a node leaves the network, the departing node sends a storage interest packet to transfer its data as part of the storage request, or replica, to a different storage node. In an example, multiple alternative storage nodes as determined by the storage strategy may be used. In an example, if if the storage node crashes or leaves the network without warning, a redundancy strategy may be employed. The redundancy strategy proactively restores data from the other nodes participating in the resiliency strategy.

In an example, nodes, such as the original requesting node, may send interest packets that query the health status of storage devices. For example, a discovery interest packet may discover all devices that have stored a particular content by name. If a storage node fails to respond, another storage interest packet may be used to replicate the data at a different node. This type of discovery enables the original node to discover changes in data storage locations.

Storage strategies that have a geo-location component may benefit from location discovery insights and respond by refining or enforcing a geo-location policy. In an example, a push based approach may be used to send periodic heart-beat or storage-health-status messages to each replica or storage node. Here the periodic heart-beat or storage-health-status data sent is in response to successful storage selection during which the storage node and the original requesting node agreed on a name-prefix for such periodic data. In an example, the PIT entry for such interests is non-expiring.

In an example, the original requesting node may proactively discover alternative storage nodes and use them if they offer better services—e.g., better as measured by lower cost, better performance, more scalable, more secure, more resilient etc. Proactive discovery and reconfiguration of the deployed storage strategy may address load balancing, data distribution, or other deployment related goals. In an example, the storage interest packet may include a field indicating that storage services are terminated. In an example, this storage interest packet may name the content for which services need to be terminated. In an example, the original requesting node may adjust the time of storage, e.g., similar to the termination of storage.

In an example, storage interest packet includes a field to indicate whether storing processed or transformed data is allowed. In addition to the field, the storage interest packet may include the name of a transformation function (e.g., compression). Here, receiving nodes with limited storage but enough computing capability may apply this transformation function first and then store the data. In the response data packet, a field may be included to indicate whether the data was stored after or before the transformation. If allowed, intermediate non-storage nodes may apply the function—assuming per packet transformation is feasible—and forward the packets further to save network bandwidth. While retrieving data from such nodes, the original requesting node may request the storage nodes apply a reverse function (e.g., in case of lossless transformation) before sending the data back. For example, processing may include a request to compress the data (e.g., through an artificial intelligence (AI) model such as a Generative Adversarial Network (GAN) or a model such as an Auto Encoder). This may in turn trigger a sequence of ICN based compute requests.

In an example, the request for storage may be made for data that is already cached in the network. In this case, the traditional ICN caching period may be modified according to the storage requirements.

Storage as a service may involve updated discovery of available storage in order to apply controlled forwarding of storage interest packets with reduced network overhead. Network of storage nodes may be divided into groups (e.g., clusters) with a leader (e.g., local-coordinator, cluster head, orchestrator, etc.) These clusters may partially overlap (e.g., some but not all nodes from cluster A are also in cluster B). Cluster heads act as local coordinators to optimize discovery of storage resources and assist in network overhead optimizations for forwarding of storage interest packets or responsive data packets.

In an example, the cluster head collects information about available storage resources at nodes in its cluster. Information collected for Storage as a service (SaaS) may include durability of storage media, performance of storage (memory bandwidth and access latency, patterns in how data will be accessed (e.g., read random), etc.), level of security, owner/storage-owners, storage cost, connectivity levels and types of storage nodes, etc. Information collection may be periodic or by event-triggered collections. The later may be helpful when large change at one or more nodes in the cluster. The cluster head may prepare an aggregated report about overall SaaS resources in the cluster—e.g., to reduce network overhead by reducing report size—which is shared periodically among neighboring clusters. In an example, a full report may be shared with a greater period, while an incremental report—e.g., with only most popular content or most recently changed information—shared in between full reports. Inter-Cluster SaaS resource information sharing enables the network to spread SaaS resource knowledge over a larger area.

In an example, the cluster head may perform an orchestration role. Here, a cluster head, upon reception of a storage interest packet, may decide to either act as an orchestrator or forward the storage interest packet to a next hop. When forwarding the storage interest packet, the next hop may be calculated based on information the cluster head has collected in advance from neighboring clusters. In an example, the storage interest packet may specify data replication information (e.g., number of replicas, geo-diversity requirements, minimum number of replicas, etc.) based on a resiliency strategy of the original storage requester along with other requirements—such as durability of storage media, performance of storage (e.g., memory bandwidth and access latency), level of security, owner/storage owners, storage cost, connectivity levels and types of storage nodes, etc. In an example, the replication strategy includes coding methods for adding the requisite redundancy.

If the cluster head determines that the requested storage services are available in the proximity that satisfy the criteria specified in the storage interest packet, the cluster head may act as orchestrator for this storage interest packet. As orchestrator, the cluster head may take actions to optimize SaaS operations or to enhance a SaaS success hit ratio with reduced network traffic overhead. For example, the cluster head may modify the storage interest packet to indicate that the cluster head is the orchestrator. In an example, the cluster head may request nodes or other cluster heads for specific or partial storage requests, for example, by splitting the original storage interest packet request into multiple storage interest packets for portions of the original storage request. An example may include using a storage interest packet to find storage for each replica in diverse geographic areas. In an example, the cluster head may decide efficient routing of requests to one or more nodes or cluster heads to ensure that a final response satisfies the request, sending an aggregated response to storage requester.

In an example, storage interest packet processing at cluster member may differ from that in a non-cluster member. For example, whenever the storage interest packet arrives at a cluster member, the cluster member may start Wait-for-CH-to-Respond-Timer. If the cluster head (CH) responds, the cluster member does not process the storage interest packet. However, if the cluster head does not respond to the storage interest packet before the Wait-for-CH-to-Respond-Timer elapses, the cluster member may respond—e.g., if the cluster member has requested storage satisfying specified criteria for at least one replica—or forward the interest packet to the next hop.

In an example, storage may be combined with other services over ICN. Compute services may be dynamically orchestrated using ICN by discovering dynamic resources (e.g., code, data, hardware, etc.). In addition, Redundant Array of Inexpensive Disks (RAID) configurations may be implemented across multiple storage nodes performed by a proxy node. Here, ICN may be used to negotiate the entire processing and storage instances. In an example, a search-friendly intermediate representation of the data—such as a searchable data summary at some nodes with pointers to full data copies at potentially other nodes—may be obtained over ICN through these compute services. Generally, Intermediate Representation (IR) of data may be lossless or lossy. For example, video stream may be lossless or lossy after encoding lossless. If the frame rate is encoded separately from color depth, multiple IRs result with all of them together resulting in lossless IR. However, when the color information is discarded (e.g., resulting in black-and-white video), the IR is now lossy. In another use case, security may be increased by storing a secret that is split across multiple nodes, such that any individual node, if compromised, will not provide access to the information. Here compute resources may be used to split and reconstruct data, again using the ICN. In order to model these complex storage and compute relationships, an additional identifier, such as storage/raid or storage/secret, may be included in the storage interest packet to facilitate finding the required resources to, for example, function as a network RAID controller or secured storage proxy. Practically it creates a service chain of ICN resources with an explicit hierarchy. This mechanism may be used to discover or enforce at once the entire service chain processing.

Policy enforcement among the various nodes may be a challenge. Nodes in the distributed system may be onboarded with specific policies that, at the local level, may be enforced by system or platform level knobs. For example, a storage retention time or time to store data in fast memory or typical block storage to provide faster access to the data. A policy may be defined for security or deadline awareness when the system needs to meet specific QoS requirements, like bounded time to retrieve data locally or within the Edge. When a policy is applied for the set of the nodes or storage region, ICN may send discovery information if a basic form of the policy may be applied to discovered hosts. In the case when a specific policy may be applied, the policy is forwarded to discover if QoS may be applied by a host.

FIG. 3 illustrates an example of a storage interest packet, according to an embodiment. The illustrated storage interest packet includes a name with a prefix ("/storage") marking it as a storage interest packet. The illustrated interest packet also includes a field for selectors (described above with respect to FIG. 1). As illustrated, the selectors may be encoded in the field using a type-length-value encoding. The nonce may be used to provide a freshness value, preventing replay attacks or the like.

FIG. 4 illustrates an example of a system to join nodes to an ICN using attestation, according to an embodiment. There may be an assumption that devices participating the storage device recruitment are trusted secure devices that have been pre-authenticated. In an untrusted cluster, a credit-reward mechanism may be used to rank the reliability of the storage nodes (from the storage requestor perspective). Meanwhile, the storage requestor may provide its own credit and how many rewards it would like to pay for this storage request transaction. Both values may be used by the storage node to evaluate and decide whether to provide the storage. The higher credit the storage node has, the higher the chance that it will be chosen as storage node. Similarly, the more rewards the requestor would like to pay, the higher possibility its request could be accepted.

However, before a node may participate in the reputation-reward, or other aspects, there may be a process to onboarding a node to the ICN network. A node may be onboarded following successful attestation and reputation appraisals. The set of nodes that have successfully achieved the appraisal is referred to here as an ICN-MESH. Onboarding adds members to the ICN-MESH. ICN-MESH members share a common set of appraisal policies that set the criteria for joining the ICN-MESH. Subsequent to joining the ICN-MESH, periodic re-evaluations build a reputation that provides insight to the operational behavior of each ICN-MESH node. Reputations enable ranking of peer ICN-MESH nodes based on several behavioral criteria such as failures, recovery time, uptime, resilience, etc. Reputation profiles may influence how NDN router functions are applied to neighboring routers and nodes. In an example, all nodes in the ICN-MESH meet a minimum policy or profile standard applied at onboarding. These minimum standards may be periodically re-assessed and, if out of compliance, an ICN-MESH node may be off-boarded (e.g., removed) from the ICN mesh.

The onboarding elements illustrated in FIG. 4 are as follows:

1) A pledge node 405 requests admittance to the ICN-MESH. In an example, All ICN Routers may service the request directly—such as NDN router 415 using the node attestation and reputation engine 420—or by forwarding to a node authorized to service the request as NDN router 410 is doing.
2) The pledge 405 provides attestation evidence that describes the pledge's root-of-trust or trustworthiness characteristics (e.g., current configuration, key protections, strength of function, etc.).
3) The verifier (e.g., NDN router 415) obtains Endorsements and Reference Values from Attestation Support Services and an appraisal policy from the ICN-MESH owner to appraise the pledge's evidence. If the pledge attestation result is successful, the other ICN-MESH nodes are notified that the pledge 405 is authorized to join the ICN-MESH.
4) A consensus technique may be used to coordinate the decision to enable the pledge 405 to join the ICN MESH. For example, other ICN-MESH nodes may review the pledge evidence and apply the attestation policies directly to ensure they arrive at the same attestation result. Consensus may be established using a GOSSIP protocol, Byzantine agreement protocols, or via Distributed Ledger Technology (DLT).
5) One of the ICN-MESH nodes (e.g., NDN router 410) onboards the pledge 405 by provisioning the pledge 405 with ICN functions, such as ICN routing, forwarding, orchestration, storage etc. The pledge 405 may also be configured as an ARE 420 to perform attestation and onboarding for other nodes. Role assignments may be granted at the time of onboarding or may be pre-assigned according to a separate privilege granting authority and process for granting privileges to a node (e.g., by X.509 certificate issuance, OAuth2 tokens, Lightweight Directory Access Protocol (LDAP) registries, etc.) The ARE may include additional configuration data that describes the various roles and criteria for granting/denying roles. The ARE may operate as a privilege granting authority.

Figure 5:
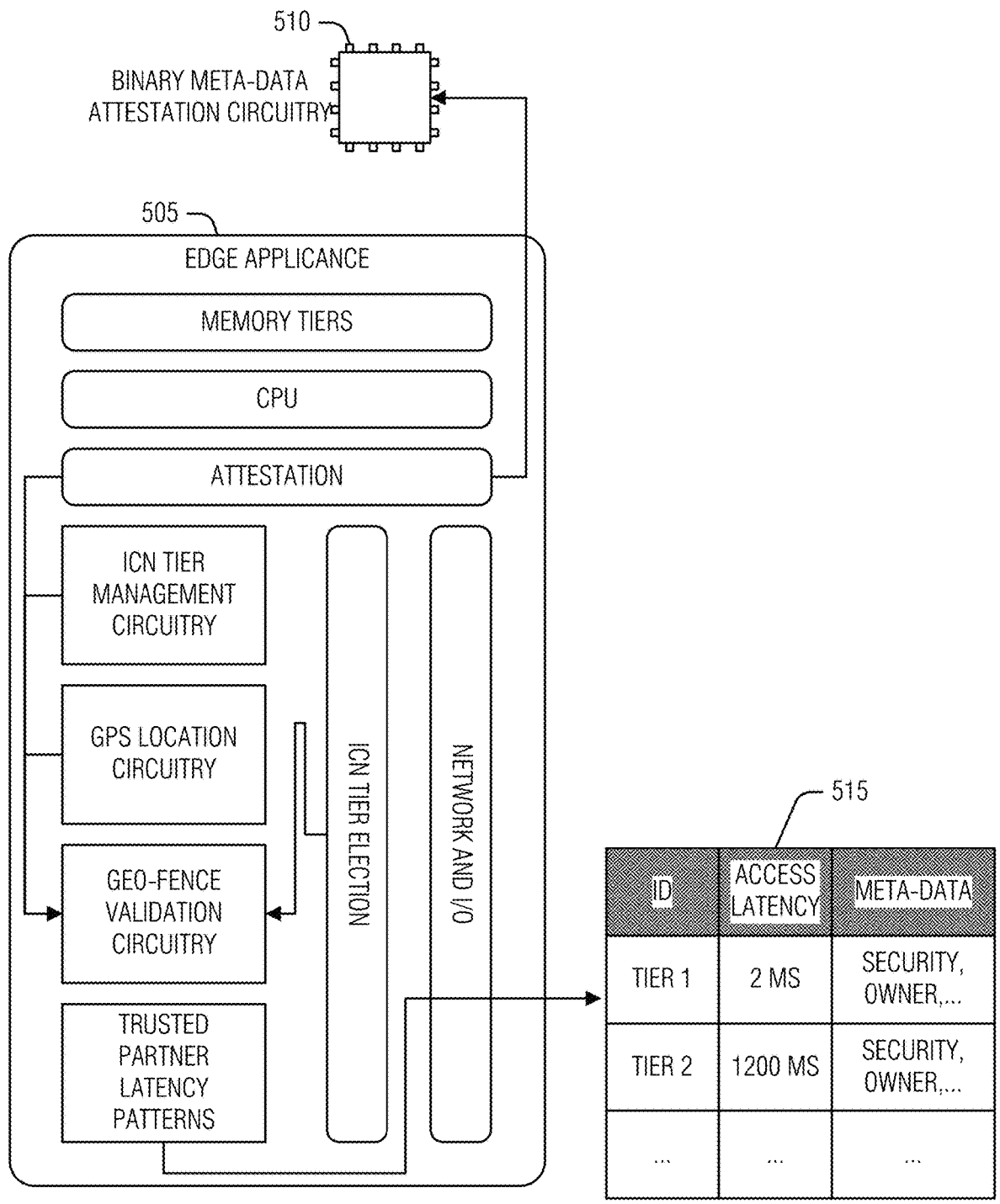
FIG. 5 illustrates an example of hardware enforced constraints, according to an embodiment.

FIG. 5 illustrates an example of hardware enforced constraints, according to an embodiment. In an example, the requirements (e.g., selectors) within a storage interest packet may include specifications for a memory tier in the event multiple tiers exist. Each memory tier may have certain functionalities or characteristics that may affect how data is being stored (e.g., security, durability, performance etc.). Thus, metadata 515 may be used by circuitry 510 of the infrastructure 505 to store data in the correct memory tier or data point. In an example, the metadata 515 may include three types of elements. The first type includes functional features or technology features. These features may include any type of information that implies how data is being stored. Some examples may include the reliability or durability of the media or the level of security (e.g., total encryption).

The second type includes performance features. These features may include any type of information that relates to performance related key-performance-indicators (KPIs) expected to be satisfied in how data may be used. Examples may be as simple as memory bandwidth or latency, or as complex as the patterns in how data will be accessed (e.g., read random).

The third type includes geo-fencing or boundary limitation requirements. An important aspect from the edge perspective control on how and where data is stored. This type of metadata 515 is focused to select where data is stored or who may store it. In an example, hints in this metadata 515 may include a geographical area where data may be stored. This may be in form of a list of countries or geo-locations. In an example, hints in this metadata 515 may include entities that are trusted and where data can be stored. This may be a list of potential storage owners that are trusted. For instance, any location managed by a content service provider A may be trusted, but the data may not be stored in content service provider B's location.

Figure 6:
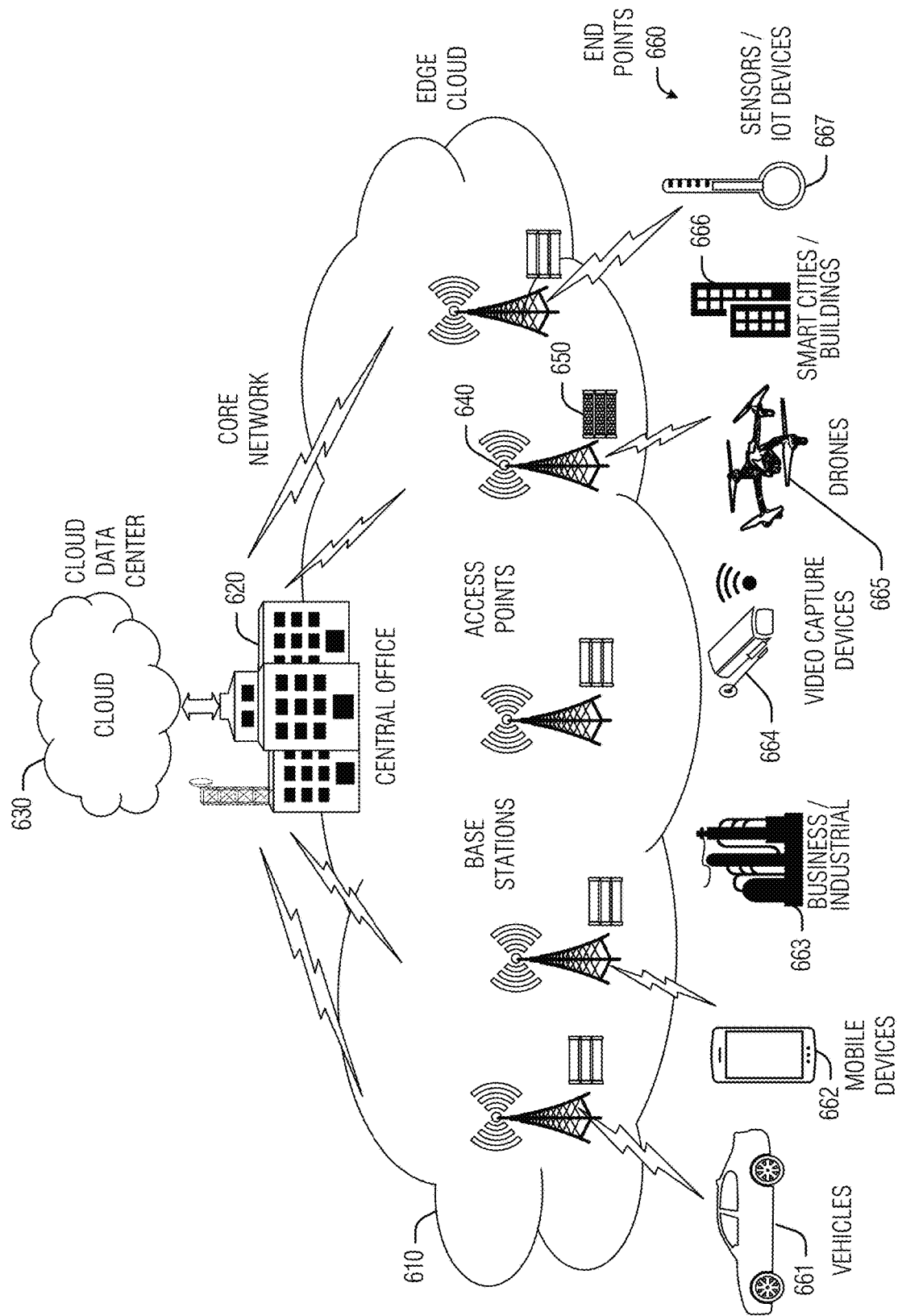
FIG. 6 illustrates an overview of an edge cloud configuration for edge computing.

FIG. 6 is a block diagram showing an overview of a configuration for edge computing, which includes a layer of processing referred to in many of the following examples as an "edge cloud". As shown, the edge cloud 610 is co-located at an edge location, such as an access point or base station 640, a local processing hub 650, or a central office 620, and thus may include multiple entities, devices, and equipment instances. The edge cloud 610 is located much closer to the endpoint (consumer and producer) data sources 660 (e.g., autonomous vehicles 661, user equipment 662, business and industrial equipment 663, video capture devices 664, drones 665, smart cities and building devices 666, sensors and IoT devices 667, etc.) than the cloud data center 630. Compute, memory, and storage resources which are offered at the edges in the edge cloud 610 are critical to providing ultra-low latency response times for services and functions used by the endpoint data sources 660 as well as reduce network backhaul traffic from the edge cloud 610 toward cloud data center 630 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 7:
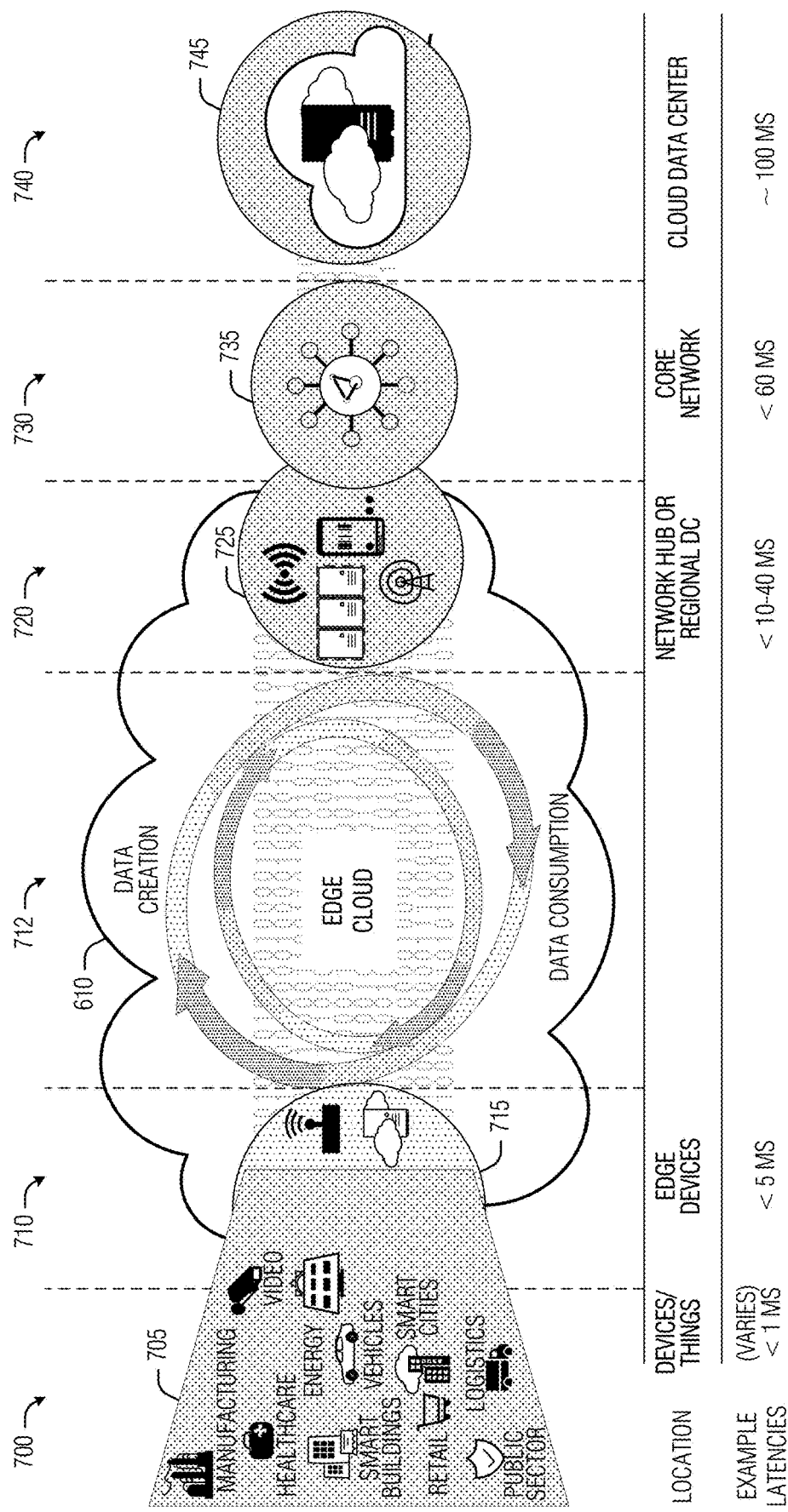
FIG. 7 illustrates operational layers among endpoints, an edge cloud, and cloud computing environments.

FIG. 7 illustrates operational layers among endpoints, an edge cloud, and cloud computing environments. Specifically, FIG. 7 depicts examples of computational use cases 705, utilizing the edge cloud 610 among multiple illustrative layers of network computing. The layers begin at an endpoint (devices and things) layer 700, which accesses the edge cloud 610 to conduct data creation, analysis, and data consumption activities. The edge cloud 610 may span multiple network layers, such as an edge devices layer 710 having gateways, on-premise servers, or network equipment (nodes 715) located in physically proximate edge systems; a network access layer 720, encompassing base stations, radio processing units, network hubs, regional data centers (DC), or local network equipment (equipment 725); and any equipment, devices, or nodes located therebetween (in layer 712, not illustrated in detail). The network communications within the edge cloud 610 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 700, under 5 ms at the edge devices layer 710, to even between 10 to 40 ms when communicating with nodes at the network access layer 720. Beyond the edge cloud 610 are core network 730 and cloud data center 740 layers, each with increasing latency (e.g., between 50-60 ms at the core network layer 730, to 100 or more ms at the cloud data center layer). As a result, operations at a core network data center 735 or a cloud data center 745, with latencies of at least 50 to 100 ms or more, will not be able to accomplish many time-critical functions of the use cases 705. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 735 or a cloud data center 745, a central office or content data network may be considered as being located within a "near edge" layer ("near" to the cloud, having high latency values when communicating with the devices and endpoints of the use cases 705), whereas an access point, base station, on-premise server, or network gateway may be considered as located within a "far edge" layer ("far" from the cloud, having low latency values when communicating with the devices and endpoints of the use cases 705). It will be understood that other categorizations of a particular network layer as constituting a "close", "local", "near", "middle", or "far" edge may be based on latency, distance, number of network hops, or other measurable characteristics, as measured from a source in any of the network layers 700-740.

The various use cases 705 may access resources under usage pressure from incoming streams, due to multiple services utilizing the edge cloud. To achieve results with low latency, the services executed within the edge cloud 610 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 610 may provide the ability to serve and respond to multiple applications of the use cases 705 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 610 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 610 (network layers 700-740), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 610.

As such, the edge cloud 610 is formed from network components and functional features operated by and within edge gateway nodes, edge aggregation nodes, or other edge compute nodes among network layers 710-730. The edge cloud 610 thus may be embodied as any type of network that provides edge computing or storage resources which are proximately located to radio access network (RAN) capable endpoint devices (e.g., mobile computing devices, IoT devices, smart devices, etc.), which are discussed herein. In other words, the edge cloud 610 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage or compute capabilities. Other types and forms of network access (e.g., Wi-Fi, long-range wireless, wired networks including optical networks) may also be utilized in place of or in combination with such 3GPP carrier networks.

The network components of the edge cloud 610 may be servers, multi-tenant servers, appliance computing devices, or any other type of computing devices. For example, the edge cloud 610 may include an appliance computing device that is a self-contained electronic device including a housing, a chassis, a case or a shell. In some circumstances, the housing may be dimensioned for portability such that it can be carried by a human or shipped. Example housings may include materials that form one or more exterior surfaces that partially or fully protect contents of the appliance, in which protection may include weather protection, hazardous environment protection (e.g., EMI, vibration, extreme temperatures), or enable submergibility. Example housings may include power circuitry to provide power for stationary or portable implementations, such as AC power inputs, DC power inputs, AC/DC or DC/AC converter(s), power regulators, transformers, charging circuitry, batteries, wired inputs or wireless power inputs. Example housings or surfaces thereof may include or connect to mounting hardware to enable attachment to structures such as buildings, telecommunication structures (e.g., poles, antenna structures, etc.) or racks (e.g., server racks, blade mounts, etc.). Example housings or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface or mounted to the surface of the appliance. Example housings or surfaces thereof may support mechanical connectivity, such as propulsion hardware (e.g., wheels, propellers, etc.) or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 11B. The edge cloud 610 may also include one or more servers or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications or other software, code or scripts may execute while being isolated from one or more other applications, software, code or scripts.

Figure 8:
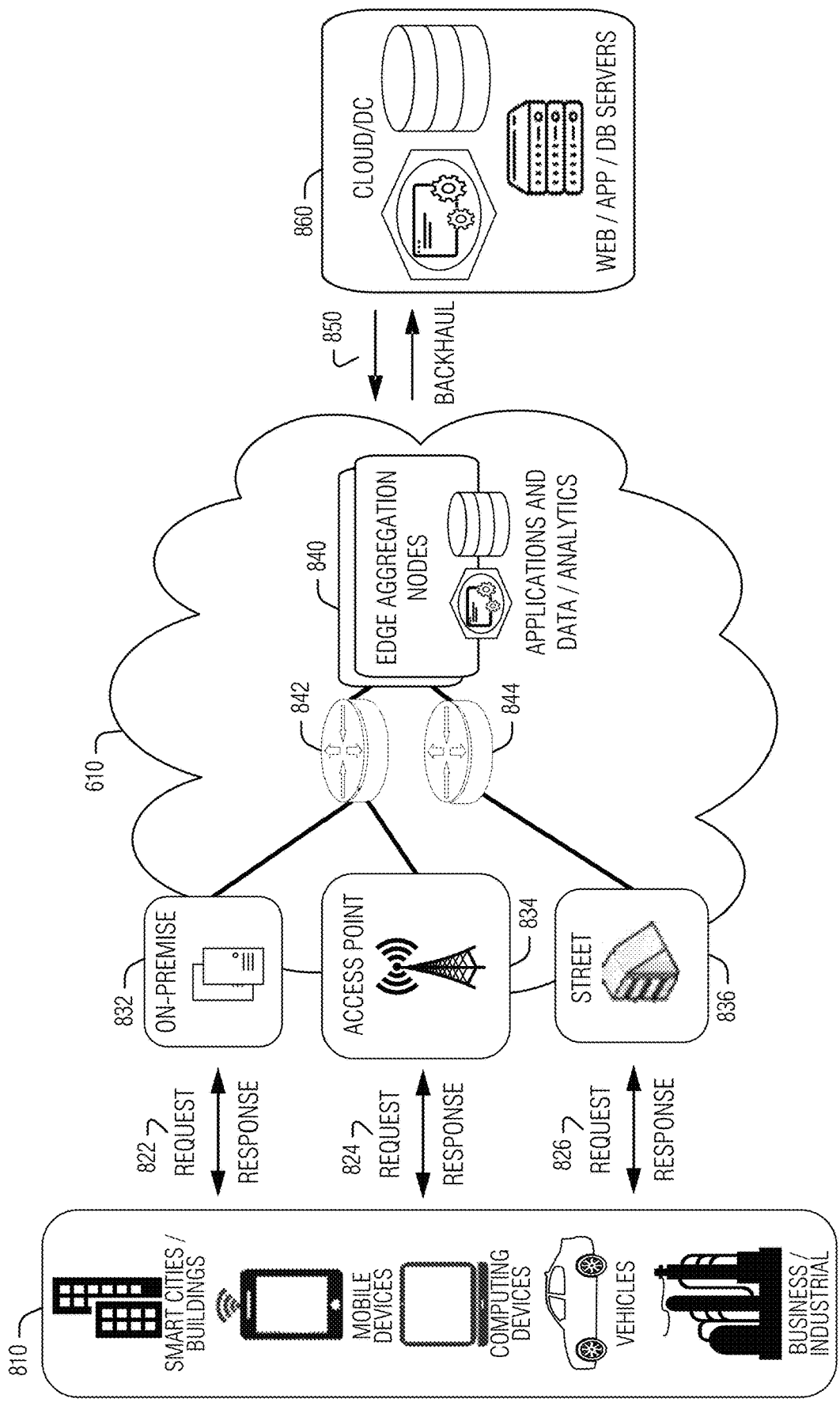
FIG. 8 illustrates an example approach for networking and services in an edge computing system.

In FIG. 8, various client endpoints 810 (in the form of mobile devices, computers, autonomous vehicles, business computing equipment, industrial processing equipment) exchange requests and responses that are specific to the type of endpoint network aggregation. For instance, client endpoints 810 may obtain network access via a wired broadband network, by exchanging requests and responses 822 through an on-premise network system 832. Some client endpoints 810, such as mobile computing devices, may obtain network access via a wireless broadband network, by exchanging requests and responses 824 through an access point (e.g., cellular network tower) 834. Some client endpoints 810, such as autonomous vehicles may obtain network access for requests and responses 826 via a wireless vehicular network through a street-located network system 836. However, regardless of the type of network access, the TSP may deploy aggregation points 842, 844 within the edge cloud 610 to aggregate traffic and requests. Thus, within the edge cloud 610, the TSP may deploy various compute and storage resources, such as at edge aggregation nodes 840, to provide requested content. The edge aggregation nodes 840 and other systems of the edge cloud 610 are connected to a cloud or data center 860, which uses a backhaul network 850 to fulfill higher-latency requests from a cloud/data center for websites, applications, database servers, etc. Additional or consolidated instances of the edge aggregation nodes 840 and the aggregation points 842, 844, including those deployed on a single server framework, may also be present within the edge cloud 610 or other areas of the TSP infrastructure.

Figure 9:
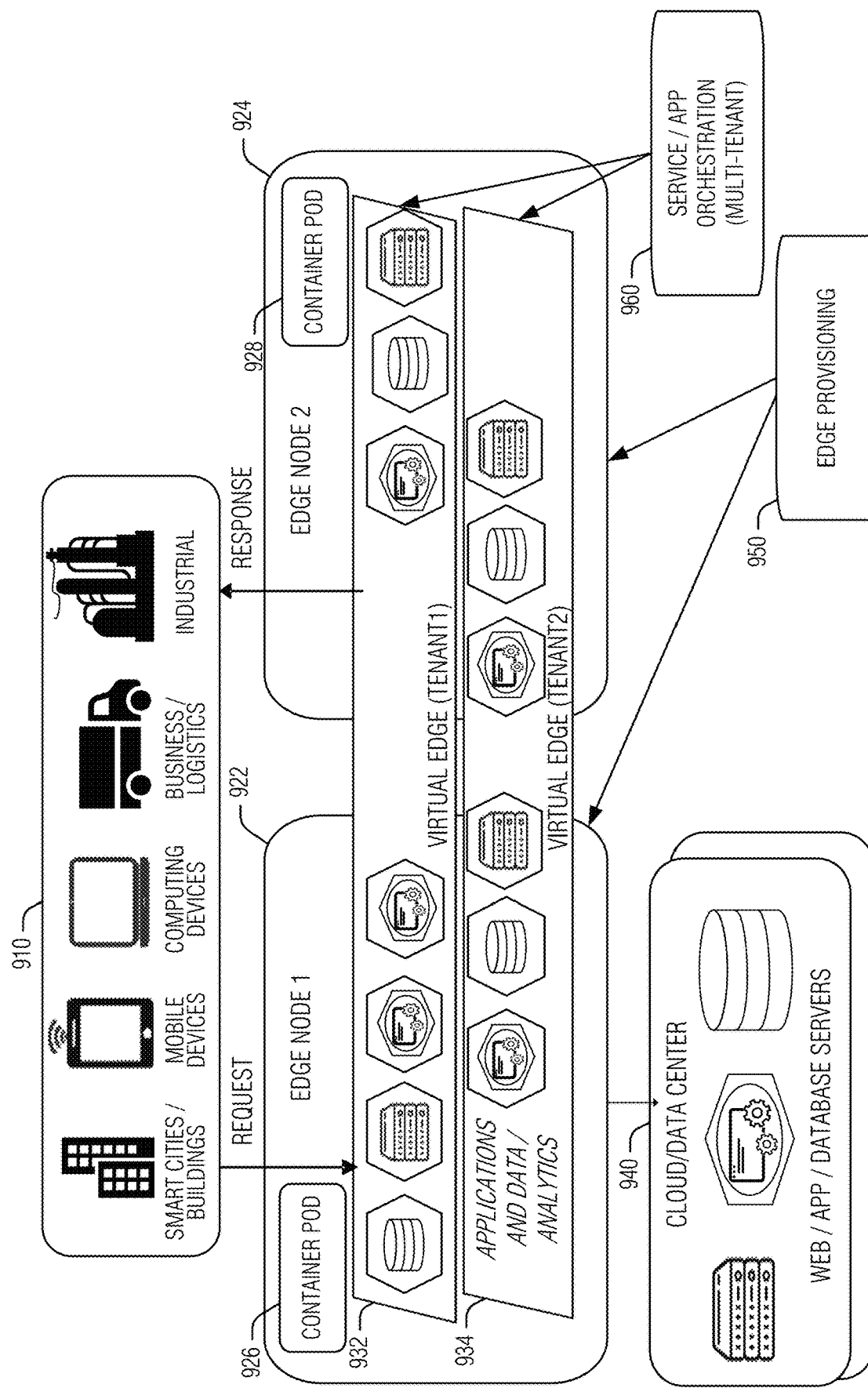
FIG. 9 illustrates deployment of a virtual edge configuration in an edge computing system operated among multiple edge nodes and multiple tenants.

FIG. 9 illustrates deployment and orchestration for virtualized and container-based edge configurations across an edge computing system operated among multiple edge nodes and multiple tenants (e.g., users, providers) which use such edge nodes. Specifically, FIG. 9 depicts coordination of a first edge node 922 and a second edge node 924 in an edge computing system, to fulfill requests and responses for various client endpoints 910 (e.g., smart cities/building systems, mobile devices, computing devices, business/logistics systems, industrial systems, etc.), which access various virtual edge instances. Here, the virtual edge instances 932, 934 provide edge compute capabilities and processing in an edge cloud, with access to a cloud/data center 940 for higher-latency requests for websites, applications, database servers, etc. However, the edge cloud enables coordination of processing among multiple edge nodes for multiple tenants or entities.

In the example of FIG. 9, these virtual edge instances include: a first virtual edge 932, offered to a first tenant (Tenant 1), which offers a first combination of edge storage, computing, and services; and a second virtual edge 934, offering a second combination of edge storage, computing, and services. The virtual edge instances 932, 934 are distributed among the edge nodes 922, 924, and may include scenarios in which a request and response are fulfilled from the same or different edge nodes. The configuration of the edge nodes 922, 924 to operate in a distributed yet coordinated fashion occurs based on edge provisioning functions 950. The functionality of the edge nodes 922, 924 to provide coordinated operation for applications and services, among multiple tenants, occurs based on orchestration functions 960.

It should be understood that some of the devices in 910 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 922, 924 may operate as security feature enforcement points for local resources allocated to multiple tenants per node. Additionally, tenant runtime and application execution (e.g., in instances 932, 934) may serve as an enforcement point for a security feature that creates a virtual edge abstraction of resources spanning potentially multiple physical hosting platforms. Finally, the orchestration functions 960 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 910, 922, and 940 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 9. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 922, 924 may implement the use of containers, such as with the use of a container "pod" 926, 928 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 932, 934 are partitioned according to the needs of each container.

With the use of container pods, a pod controller oversees the partitioning and allocation of containers and resources. The pod controller receives instructions from an orchestrator (e.g., orchestrator 960) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 960 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 10:
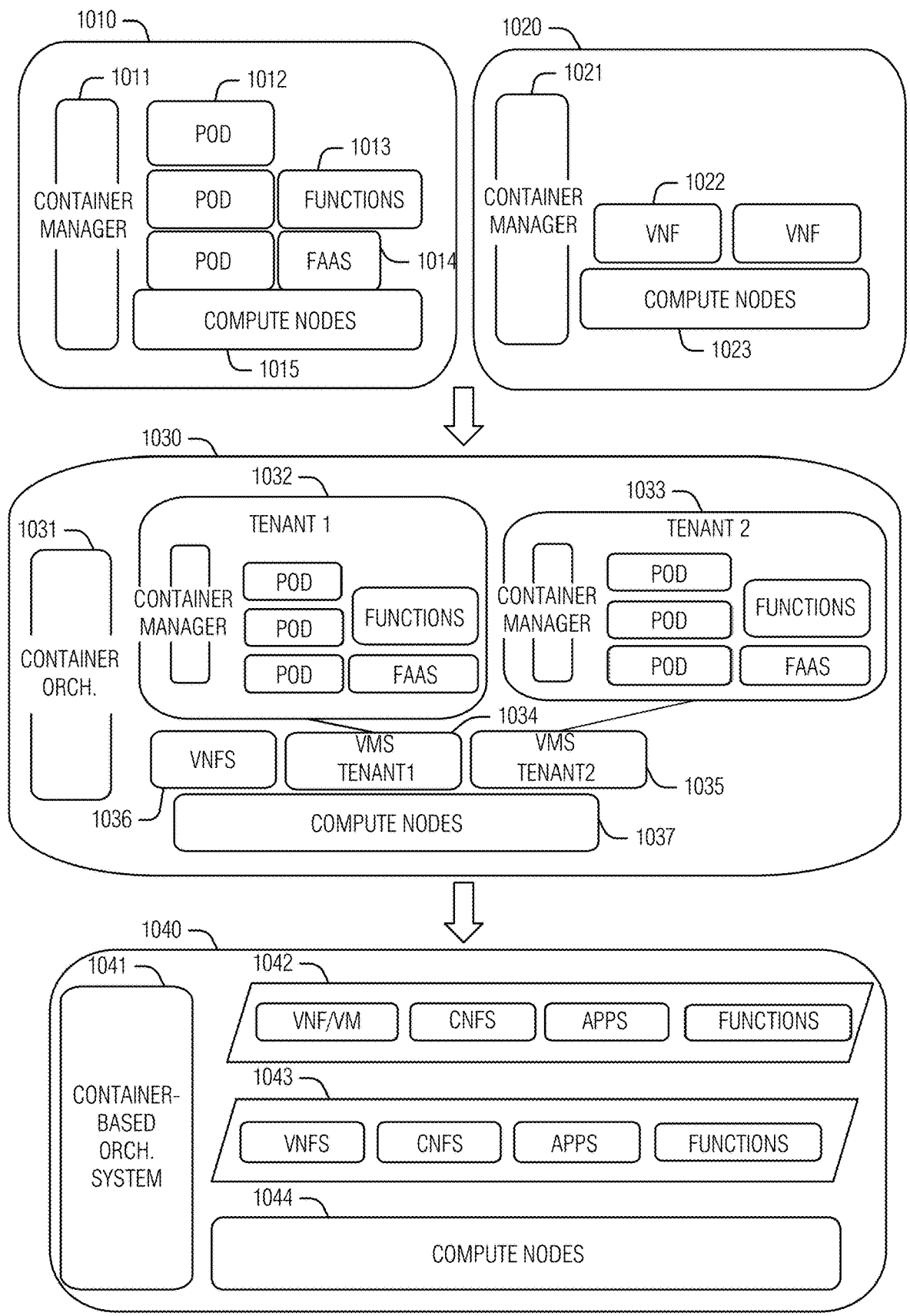
FIG. 10 illustrates various compute arrangements deploying containers in an edge computing system.

FIG. 10 illustrates additional compute arrangements deploying containers in an edge computing system. As a simplified example, system arrangements 1010, 1020 depict settings in which a pod controller (e.g., container managers 1011, 1021, and container orchestrator 1031) is adapted to launch containerized pods, functions, and functions-as-a-service instances through execution via compute nodes (1015 in arrangement 1010), or to separately execute containerized virtualized network functions through execution via compute nodes (1023 in arrangement 1020). This arrangement is adapted for use of multiple tenants in system arrangement 1030 (using compute nodes 1037), where containerized pods (e.g., pods 1012), functions (e.g., functions 1013, VNFs 1022, 1036), and functions-as-a-service instances (e.g., FaaS instance 1014) are launched within virtual machines (e.g., VMs 1034, 1035 for tenants 1032, 1033) specific to respective tenants (aside the execution of virtualized network functions). This arrangement is further adapted for use in system arrangement 1040, which provides containers 1042, 1043, or execution of the various functions, applications, and functions on compute nodes 1044, as coordinated by an container-based orchestration system 1041.

The system arrangements of depicted in FIG. 10 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 10, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

In further examples, any of the compute nodes or devices discussed with reference to the present edge computing systems and environment may be fulfilled based on the components depicted in FIGS. 11A and 11B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

In the simplified example depicted in FIG. 11A, an edge compute node 1100 includes a compute engine (also referred to herein as "compute circuitry") 1102, an input/output (I/O) subsystem 1108, data storage 1110, a communication circuitry subsystem 1112, and, optionally, one or more peripheral devices 1114. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1100 may be embodied as any type of engine, device, or collection of devices capable of performing various compute functions. In some examples, the compute node 1100 may be embodied as a single device such as an integrated circuit, an embedded system, a field-programmable gate array (FPGA), a system-on-a-chip (SOC), or other integrated system or device. In the illustrative example, the compute node 1100 includes or is embodied as a processor 1104 and a memory 1106. The processor 1104 may be embodied as any type of processor capable of performing the functions described herein (e.g., executing an application). For example, the processor 1104 may be embodied as a multi-core processor(s), a microcontroller, a processing unit, a specialized or special purpose processing unit, or other processor or processing/controlling circuit.

In some examples, the processor 1104 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1104 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1104 may work in coordination with each other to execute many types of operations and instructions within and on behalf of the compute node 1100.

The memory 1106 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RANI), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1106 may be integrated into the processor 1104. The memory 1106 may store various software and data used during operation such as one or more applications, data operated on by the application(s), libraries, and drivers.

The compute circuitry 1102 is communicatively coupled to other components of the compute node 1100 via the I/O subsystem 1108, which may be embodied as circuitry or components to facilitate input/output operations with the compute circuitry 1102 (e.g., with the processor 1104 or the main memory 1106) and other components of the compute circuitry 1102. For example, the I/O subsystem 1108 may be embodied as, or otherwise include, memory controller hubs, input/output control hubs, integrated sensor hubs, firmware devices, communication links (e.g., point-to-point links, bus links, wires, cables, light guides, printed circuit board traces, etc.), or other components and subsystems to facilitate the input/output operations. In some examples, the I/O subsystem 1108 may form a portion of a system-on-a-chip (SoC) and be incorporated, along with one or more of the processor 1104, the memory 1106, and other components of the compute circuitry 1102, into the compute circuitry 1102.

The one or more illustrative data storage devices 1110 may be embodied as any type of devices configured for short-term or long-term storage of data such as, for example, memory devices and circuits, memory cards, hard disk drives, solid-state drives, or other data storage devices. Individual data storage devices 1110 may include a system partition that stores data and firmware code for the data storage device 1110. Individual data storage devices 1110 may also include one or more operating system partitions that store data files and executables for operating systems depending on, for example, the type of compute node 1100.

The communication circuitry 1112 may be embodied as any communication circuit, device, or collection thereof, capable of enabling communications over a network between the compute circuitry 1102 and another compute device (e.g., an edge gateway of an implementing edge computing system). The communication circuitry 1112 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1112 includes a network interface controller (MC) 1120, which may also be referred to as a host fabric interface (HFI). The NIC 1120 may be embodied as one or more add-in-boards, daughter cards, network interface cards, controller chips, chipsets, or other devices that may be used by the compute node 1100 to connect with another compute device (e.g., an edge gateway node). In some examples, the NIC 1120 may be embodied as part of a system-on-a-chip (SoC) that includes one or more processors, or included on a multichip package that also contains one or more processors. In some examples, the MC 1120 may include a local processor (not shown) or a local memory (not shown) that are both local to the NIC 1120. In such examples, the local processor of the NIC 1120 may be capable of performing one or more of the functions of the compute circuitry 1102 described herein. Additionally, or alternatively, in such examples, the local memory of the MC 1120 may be integrated into one or more components of the client compute node at the board level, socket level, chip level, or other levels.

Additionally, in some examples, a respective compute node 1100 may include one or more peripheral devices 1114. Such peripheral devices 1114 may include any type of peripheral device found in a compute device or server such as audio input devices, a display, other input/output devices, interface devices, or other peripheral devices, depending on the particular type of the compute node 1100. In further examples, the compute node 1100 may be embodied by a respective edge compute node (whether a client, gateway, or aggregation node) in an edge computing system or like forms of appliances, computers, subsystems, circuitry, or other components.

In a more detailed example, FIG. 11B illustrates a block diagram of an example of components that may be present in an edge computing node 1150 for implementing the techniques (e.g., operations, processes, methods, and methodologies) described herein. This edge computing node 1150 provides a closer view of the respective components of node 1100 when implemented as or as part of a computing device (e.g., as a mobile device, a base station, server, gateway, etc.). The edge computing node 1150 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1150, or as components otherwise incorporated within a chassis of a larger system.

The edge computing device 1150 may include processing circuitry in the form of a processor 1152, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1152 may be a part of a system on a chip (SoC) in which the processor 1152 and other components are formed into a single integrated circuit, or a single package, such as the Edison™ or Galileo™ SoC boards from Intel Corporation, Santa Clara, California As an example, the processor 1152 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1152 and accompanying circuitry may be provided in a single socket form factor, multiple socket form factor, or a variety of other formats, including in limited hardware configurations or configurations that include fewer than all elements shown in FIG. 11B.

The processor 1152 may communicate with a system memory 1154 over an interconnect 1156 (e.g., a bus). Any number of memory devices may be used to provide for a given amount of system memory. As examples, the memory 1154 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example, the storage 1158 may be implemented via a solid-state disk drive (SSDD). Other devices that may be used for the storage 1158 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies.

The interconnect 1156 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1156 may couple the processor 1152 to a transceiver 1166, for communications with the connected edge devices 1162. The transceiver 1166 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1162. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1166 (or multiple transceivers) may communicate using multiple standards or radios for communications at a different range. For example, the edge computing node 1150 may communicate with close devices, e.g., within about 10 meters, using a local transceiver based on Bluetooth Low Energy (BLE), or another low power radio, to save power. More distant connected edge devices 1162, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1166 (e.g., a radio transceiver) may be included to communicate with devices or services in a cloud (e.g., an edge cloud 1195) via local or wide area network protocols. The wireless network transceiver 1166 may be a low-power wide-area (LPWA) transceiver that follows the IEEE 802.15.4, or IEEE 802.15.4g standards, among others. The edge computing node 1150 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1166, as described herein. For example, the transceiver 1166 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1166 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (MC) 1168 may be included to provide a wired communication to nodes of the edge cloud 1195 or to other devices, such as the connected edge devices 1162 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to enable connecting to a second network, for example, a first NIC 1168 providing communications to the cloud over Ethernet, and a second MC 1168 providing communications to other devices over another type of network.

Given the variety of types of applicable communications from the device to another component or network, applicable communications circuitry used by the device may include or be embodied by any one or more of components 1164, 1166, 1168, or 1170. Accordingly, in various examples, applicable means for communicating (e.g., receiving, transmitting, etc.) may be embodied by such communications circuitry.

The edge computing node 1150 may include or be coupled to acceleration circuitry 1164, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1156 may couple the processor 1152 to a sensor hub or external interface 1170 that is used to connect additional devices or subsystems. The devices may include sensors 1172, such as accelerometers, level sensors, flow sensors, optical light sensors, camera sensors, temperature sensors, global navigation system (e.g., GPS) sensors, pressure sensors, barometric pressure sensors, and the like. The hub or interface 1170 further may be used to connect the edge computing node 1150 to actuators 1174, such as power switches, valve actuators, an audible sound generator, a visual warning device, and the like.

In some optional examples, various input/output (I/O) devices may be present within or connected to, the edge computing node 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1150. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1176 may power the edge computing node 1150, although, in examples in which the edge computing node 1150 is mounted in a fixed location, it may have a power supply coupled to an electrical grid, or the battery may be used as a backup or for temporary capabilities. The battery 1176 may be a lithium ion battery, or a metal-air battery, such as a zinc-air battery, an aluminum-air battery, a lithium-air battery, and the like.

A battery monitor/charger 1178 may be included in the edge computing node 1150 to track the state of charge (SoCh) of the battery 1176, if included. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1178 may communicate the information on the battery 1176 to the processor 1152 over the interconnect 1156. The battery monitor/charger 1178 may also include an analog-to-digital (ADC) converter that enables the processor 1152 to directly monitor the voltage of the battery 1176 or the current flow from the battery 1176. The battery parameters may be used to determine actions that the edge computing node 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the edge computing node 1150. A wireless battery charging circuit, such as an LTC4020 chip from Linear Technologies of Milpitas, California, among others, may be included in the battery monitor/charger 1178. The specific charging circuits may be selected based on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine-readable medium 1160 including code to direct the processor 1152 to perform electronic operations in the edge computing node 1150. The processor 1152 may access the non-transitory, machine-readable medium 1160 over the interconnect 1156. For instance, the non-transitory, machine-readable medium 1160 may be embodied by devices described for the storage 1158 or may include specific storage units such as optical disks, flash drives, or any number of other hardware devices. The non-transitory, machine-readable medium 1160 may include instructions to direct the processor 1152 to perform a specific sequence or flow of actions, for example, as described with respect to the flowchart(s) and block diagram(s) of operations and functionality depicted above. As used herein, the terms "machine-readable medium" and "computer-readable medium" are interchangeable. Also in a specific example, the instructions 1182 on the processor 1152 (separately, or in combination with the instructions 1182 of the machine readable medium 1160) may configure execution or operation of a trusted execution environment (TEE) 1190. In an example, the TEE 1190 operates as a protected area accessible to the processor 1152 for secure execution of instructions and secure access to data. Various implementations of the TEE 1190, and an accompanying secure area in the processor 1152 or the memory 1154 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1150 through the TEE 1190 and the processor 1152.

Figure 12:
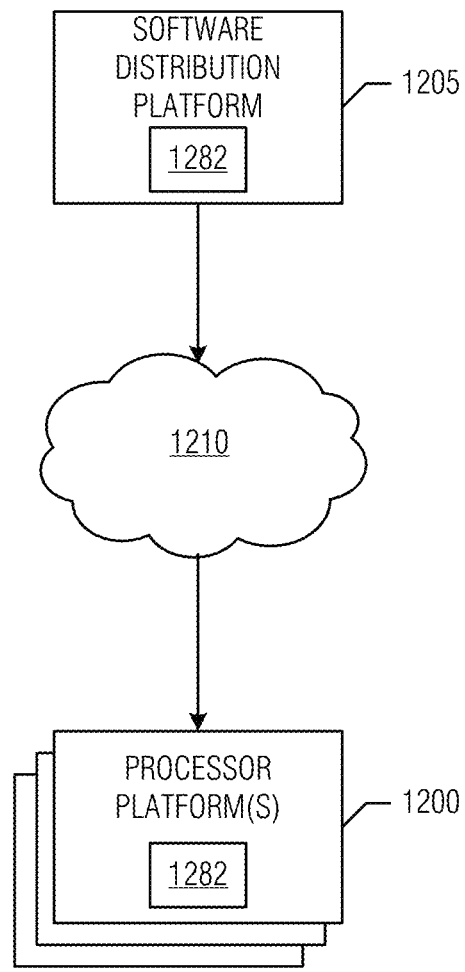
FIG. 12 illustrates an example software distribution platform to distribute software.

FIG. 12 illustrates an example software distribution platform 1205 to distribute software, such as the example computer readable instructions 1282 of FIG. 12, to one or more devices, such as example processor platform(s) 1200 or connected edge devices. The example software distribution platform 1205 may be implemented by any computer server, data facility, cloud service, etc., capable of storing and transmitting software to other computing devices (e.g., third parties, or connected edge devices). Example connected edge devices may be customers, clients, managing devices (e.g., servers), third parties (e.g., customers of an entity owning or operating the software distribution platform 1205). Example connected edge devices may operate in commercial or home automation environments. In some examples, a third party is a developer, a seller, or a licensor of software such as the example computer readable instructions 1282 of FIG. 12. The third parties may be consumers, users, retailers, OEMs, etc. that purchase or license the software for use or re-sale or sub-licensing. In some examples, distributed software causes display of one or more user interfaces (UIs) or graphical user interfaces (GUIs) to identify the one or more devices (e.g., connected edge devices) geographically or logically separated from each other (e.g., physically separated IoT devices chartered with the responsibility of water distribution control (e.g., pumps), electricity distribution control (e.g., relays), etc.).

In the illustrated example of FIG. 12, the software distribution platform 1205 includes one or more servers and one or more storage devices. The storage devices store the computer readable instructions 1282, which may correspond to the example computer readable instructions illustrated in the figures and described herein. The one or more servers of the example software distribution platform 1205 are in communication with a network 1210, which may correspond to any one or more of the Internet or any of the example networks described herein. In some examples, the one or more servers are responsive to requests to transmit the software to a requesting party as part of a commercial transaction. Payment for the delivery, sale or license of the software may be handled by the one or more servers of the software distribution platform or via a third-party payment entity. The servers enable purchasers or licensors to download the computer readable instructions 1282 from the software distribution platform 1205. For example, the software, which may correspond to the example computer readable instructions described herein, may be downloaded to the example processor platform(s) 1200 (e.g., example connected edge devices), which are to execute the computer readable instructions 1282 to implement the technique. In some examples, one or more servers of the software distribution platform 1205 are communicatively connected to one or more security domains or security devices through which requests and transmissions of the example computer readable instructions 1282 must pass. In some examples, one or more servers of the software distribution platform 1205 periodically offer, transmit, or force updates to the software (e.g., the example computer readable instructions 1282 of FIG. 12) to ensure improvements, patches, updates, etc. are distributed and applied to the software at the end user devices.

In the illustrated example of FIG. 12, the computer readable instructions 1282 are stored on storage devices of the software distribution platform 1205 in a particular format. A format of computer readable instructions includes, but is not limited to a particular code language (e.g., Java, JavaScript, Python, C, C #, SQL, HTML, etc.), or a particular code state (e.g., uncompiled code (e.g., ASCII), interpreted code, linked code, executable code (e.g., a binary), etc.). In some examples, the computer readable instructions 1282 stored in the software distribution platform 1205 are in a first format when transmitted to the example processor platform(s) 1200. In some examples, the first format is an executable binary in which particular types of the processor platform(s) 1200 can execute. However, in some examples, the first format is uncompiled code that requires one or more preparation tasks to transform the first format to a second format to enable execution on the example processor platform(s) 1200. For instance, the receiving processor platform(s) 1200 may need to compile the computer readable instructions 1282 in the first format to generate executable code in a second format that is capable of being executed on the processor platform(s) 1200. In still other examples, the first format is interpreted code that, upon reaching the processor platform(s) 1200, is interpreted by an interpreter to facilitate execution of instructions.

Figure 13:
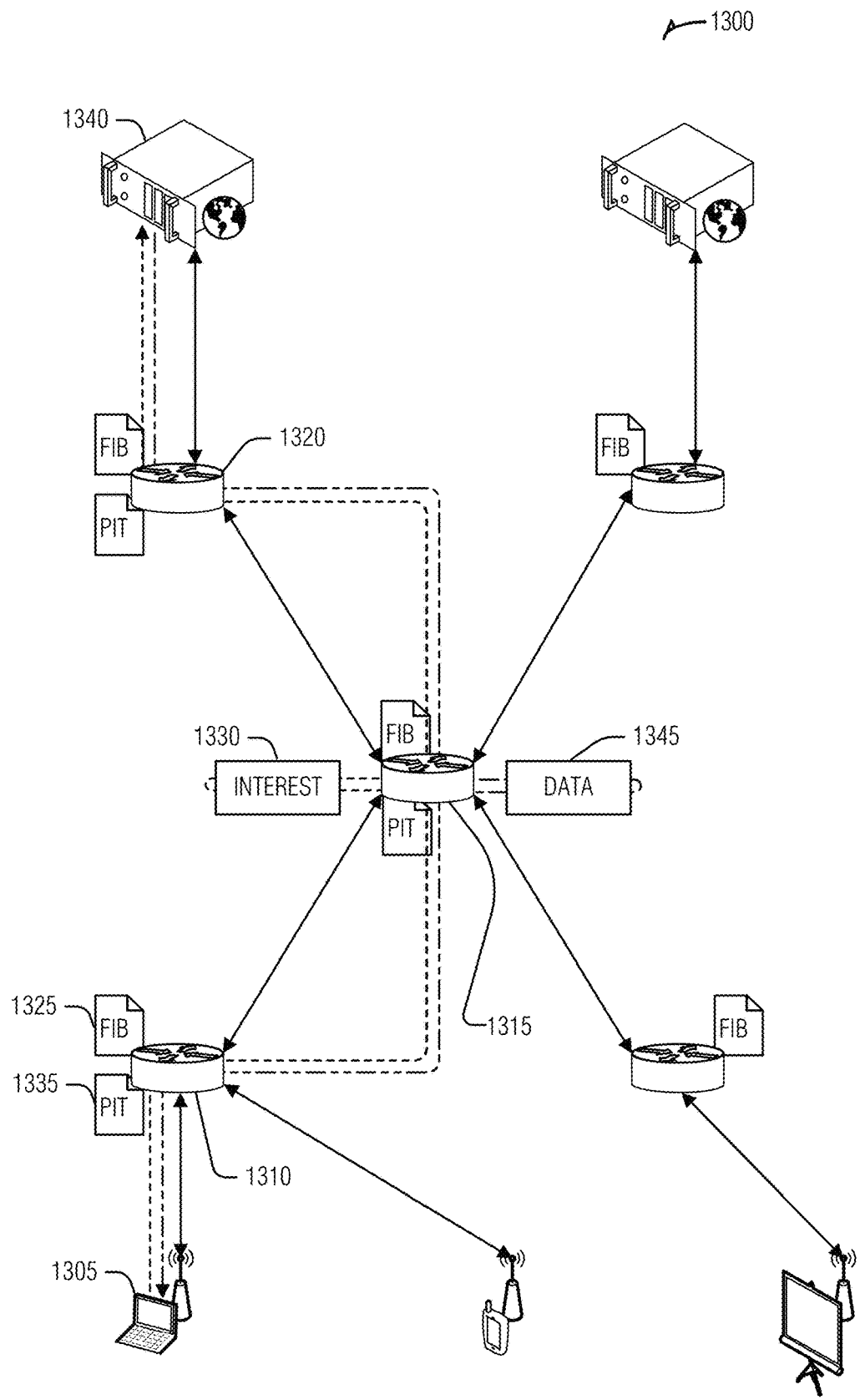
FIG. 13 illustrates an example information centric network (ICN), according to an embodiment.

FIG. 13 illustrates an example information centric network (ICN), according to an embodiment. ICNs operate differently than traditional host-based (e.g., address-based) communication networks. ICN is an umbrella term for a networking paradigm in which information and/or functions themselves are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 1305 (e.g., subscriber) requests named content from the network itself. The content request may be called an interest and transmitted via an interest packet 1330. As the interest packet traverses network devices (e.g., network elements, routers, switches, hubs, etc.)—such as network elements 1310, 1315, and 1320—a record of the interest is kept, for example, in a pending interest table (PIT) at each network element. Thus, network element 1310 maintains an entry in its PIT 1335 for the interest packet 1330, network element 1315 maintains the entry in its PIT, and network element 1320 maintains the entry in its PIT.

When a device, such as publisher 1340, that has content matching the name in the interest packet 1330 is encountered, that device 1340 may send a data packet 1345 in response to the interest packet 1330. Typically, the data packet 1345 is tracked back through the network to the source (e.g., device 1305) by following the traces of the interest packet 1330 left in the network element PITs. Thus, the PIT 1335 at each network element establishes a trail back to the subscriber 1305 for the data packet 1345 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 1330 traverses the ICN, ICN network elements will generally attempt to match the name to a greatest degree. Thus, if an ICN element has a cached item or route for both "www.somedomain.com or videos" and "www.somedomain.com www.somedomain.com or videos or v8675309," the ICN element will match the later for an interest packet 1330 specifying "www.somedomain.com or videos or v8675309." In an example, an expression may be used in matching by the ICN device. For example, the interest packet may specify "www.somedomain.com or videos or v8675*" where is a wildcard. Thus, any cached item or route that includes the data other than the wildcard will be matched.

Item matching involves matching the interest 1330 to data cached in the ICN element. Thus, for example, if the data 1345 named in the interest 1330 is cached in network element 1315, then the network element 1315 will return the data 1345 to the subscriber 1305 via the network element 1310. However, if the data 1345 is not cached at network element 1315, the network element 1315 routes the interest 1330 on (e.g., to network element 1320). To facilitate routing, the network elements may use a forwarding information base 1325 (FIB) to match named data to an interface (e.g., physical port) for the route. Thus, the FIB 1325 operates much like a routing table on a traditional network device.

In an example, additional metadata may be attached to the interest packet 1330, the cached data, or the route (e.g., in the FIB 1325), to provide an additional level of matching. For example, the data name may be specified as "www.somedomain.com www.somedomain.com or videos or v8675309," but also include a version number—or timestamp, time range, endorsement, etc. In this example, the interest packet 1330 may specify the desired name, the version number, or the version range. The matching may then locate routes or cached data matching the name and perform the additional comparison of metadata or the like to arrive at an ultimate decision as to whether data or a route matches the interest packet 1330 for respectively responding to the interest packet 1330 with the data packet 1345 or forwarding the interest packet 1330.

ICN has advantages over host-based networking because the data segments are individually named. This enables aggressive caching throughout the network as a network element may provide a data packet 1330 in response to an interest 1330 as easily as an original author 1340. Accordingly, it is less likely that the same segment of the network will transmit duplicates of the same data requested by different devices.

Fine grained encryption is another feature of many ICN networks. A typical data packet 1345 includes a name for the data that matches the name in the interest packet 1330. Further, the data packet 1345 includes the requested data and may include additional information to filter similarly named data (e.g., by creation time, expiration time, version, etc.). To address malicious entities providing false information under the same name, the data packet 1345 may also encrypt its contents with a publisher key or provide a cryptographic hash of the data and the name. Thus, knowing the key (e.g., from a certificate of an expected publisher 1340) enables the recipient to ascertain whether the data is from that publisher 1340. This technique also facilitates the aggressive caching of the data packets 1345 throughout the network because each data packet 1345 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 14:
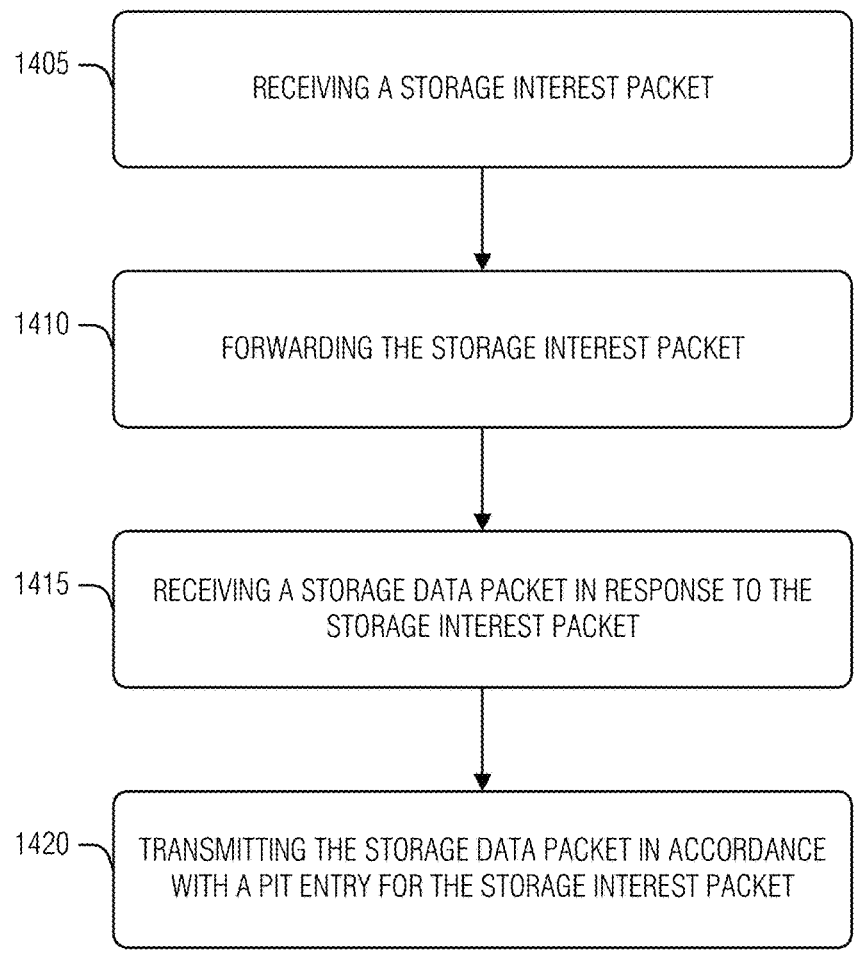
FIG. 14 illustrates a flow diagram of an example of a method for ICN tunneling, according to an embodiment.

FIG. 14 illustrates a flow diagram of an example of a method 1400 for storage node recruitment in an ICN, according to an embodiment. The operations of the method 1400 are performed by computational hardware, such as that described above or below (e.g., processing circuitry).

At operation 1405, an ICN node receives a storage interest packet. Here, the storage interest includes an indication differentiating the storage interest from other ICN interests. In an example, the storage interest packet includes a set of selectors. Here, the set of selectors are used by nodes to determine storage requirements for data indicated in the storage interest packet. In an example, the set of selectors include a platform requirement, security requirement, an integrity requirement, a storage requirement, or a transformation requirement. In an example, the storage requirement restricts the data to a geographic area. In an example, the platform requirement enforces minimum performance of components. In an example, the transformation requirement defines what transformations to the data are acceptable during storage. In an example, compression or encryption are transformations to the data.

In an example, the ICN node is part of an ICN network, where the ICN node passed an attestation process to join the ICN network. In an example, the attestation process includes pledging the ICN network including providing attestation evidence and being onboarded after a verifier of the ICN network receives endorsements or reference values of the attestation evidence from other nodes of the ICN network.

At operation 1410, the storage interest packet is forwarded.

At operation 1415, a storage data packet is received in response to the storage interest packet. Here, the storage data packet includes an indication that the storage data packet is not to be cached. The storage data packet also includes node information for a node that created the storage data packet. In an example, where the storage interest packet included a set of selectors, the node that created the storage data packet met the storage requirements.

At operation 1420, the storage data packet is transmitted in accordance with a pending interest table (PIT) entry corresponding to the storage interest packet.

In an example, the operations of the method 1400 include determining that the ICN node has resources that satisfy the storage interest packet. Here, the ICN node may create a second storage data packet that includes information about the ICN node and transmit the second storage data packet in accordance with the PIT entry. In an example, the ICN node transmits, an interest packet for data identified in the storage interest packet through an interface used to receive the storage interest packet.

In an example, the operations of the method 1400 include determining that a node in a cluster—to which the ICN node belongs—has resources that satisfy the storage interest packet. Here, the ICN node may create a second storage data packet that includes information about the node in the cluster and transmit the second storage data packet in accordance with the PIT entry. In an example, the ICN node periodically communicates with nodes in the cluster to obtain node information including the information about the node in the cluster. In an example,
the ICN node is a cluster head organizing storage interest packets and storage data packets for the cluster.

FIG. 15 illustrates a block diagram of an example machine 1500 upon which any one or more of the techniques (e.g., methodologies) discussed herein may perform. Examples, as described herein, may include, or may operate by, logic or a number of components, or mechanisms in the machine 1500. Circuitry (e.g., processing circuitry) is a collection of circuits implemented in tangible entities of the machine 1500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1500 follow.

In alternative embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environment. The machine 1500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1500 may include a hardware processor 1502 (e.g., a central processing unit (CPU), a graphics processing unit (GPU), a hardware processor core, or any combination thereof), a main memory 1504, a static memory (e.g., memory or storage for firmware, microcode, a basic-input-output (BIOS), unified extensible firmware interface (UEFI), etc.) 1506, and mass storage 1508 (e.g., hard drives, tape drives, flash storage, or other block devices) some or all of which may communicate with each other via an interlink (e.g., bus) 1530. The machine 1500 may further include a display unit 1510, an alphanumeric input device 1512 (e.g., a keyboard), and a user interface (UI) navigation device 1514 (e.g., a mouse). In an example, the display unit 1510, input device 1512 and UI navigation device 1514 may be a touch screen display. The machine 1500 may additionally include a storage device (e.g., drive unit) 1508, a signal generation device 1518 (e.g., a speaker), a network interface device 1520, and one or more sensors 1516, such as a global positioning system (GPS) sensor, compass, accelerometer, or other sensor. The machine 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1502, the main memory 1504, the static memory 1506, or the mass storage 1508 may be, or include, a machine readable medium 1522 on which is stored one or more sets of data structures or instructions 1524 (e.g., software) embodying or utilized by any one or more of the techniques or functions described herein. The instructions 1524 may also reside, completely or at least partially, within any of registers of the processor 1502, the main memory 1504, the static memory 1506, or the mass storage 1508 during execution thereof by the machine 1500. In an example, one or any combination of the hardware processor 1502, the main memory 1504, the static memory 1506, or the mass storage 1508 may constitute the machine readable media 1522. While the machine readable medium 1522 is illustrated as a single medium, the term "machine readable medium" may include a single medium or multiple media (e.g., a centralized or distributed database, or associated caches and servers) configured to store the one or more instructions 1524.

The term "machine readable medium" may include any medium that is capable of storing, encoding, or carrying instructions for execution by the machine 1500 and that cause the machine 1500 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1522 may be representative of the instructions 1524, such as instructions 1524 themselves or a format from which the instructions 1524 may be derived. This format from which the instructions 1524 may be derived may include source code, encoded instructions (e.g., in compressed or encrypted form), packaged instructions (e.g., split into multiple packages), or the like. The information representative of the instructions 1524 in the machine readable medium 1522 may be processed by processing circuitry into the instructions to implement any of the operations discussed herein. For example, deriving the instructions 1524 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1524.

In an example, the derivation of the instructions 1524 may include assembly, compilation, or interpretation of the information (e.g., by the processing circuitry) to create the instructions 1524 from some intermediate or preprocessed format provided by the machine readable medium 1522. The information, when provided in multiple parts, may be combined, unpacked, and modified to create the instructions 1524. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1524 may be further transmitted or received over a communications network 1526 using a transmission medium via the network interface device 1520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks, among others. In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1500, and includes digital or analog communications signals or other intangible medium to facilitate communication of such software. A transmission medium is a machine readable medium.

Additional Notes & Examples

Example 1 is a device for storage node recruitment in an information centric network (ICN), the device comprising: a memory including instructions; and processing circuitry that, when in operation, is configured by the instructions to: receive, at an ICN node, a storage interest packet, the storage interest including an indication differentiating the storage interest from other ICN interests; forward the storage interest packet; receive a storage data packet in response to the storage interest packet, the storage data packet including an indication that the storage data packet is not to be cached, the storage data packet including node information for a node that created the storage data packet; and transmit the storage data packet in accordance with a pending interest table (PIT) entry corresponding to the storage interest packet.

In Example 2, the subject matter of Example 1, wherein the storage interest packet includes a set of selectors, wherein the set of selectors is used by nodes to determine storage requirements for data indicated in the storage interest packet, and wherein the node that created the storage data packet met the storage requirements.

In Example 3, the subject matter of Example 2, wherein the set of selectors includes a platform requirement, security requirement, an integrity requirement, a storage requirement, or a transformation requirement.

In Example 4, the subject matter of Example 3, wherein the storage requirement restricts the data to a geographic area.

In Example 5, the subject matter of any of Examples 3-4, wherein the platform requirement enforces minimum performance of components.

In Example 6, the subject matter of any of Examples 3-5, wherein the transformation requirement defines which transformations to the data are acceptable during storage.

In Example 7, the subject matter of Example 6, wherein compression or encryption are transformations to the data.

In Example 8, the subject matter of any of Examples 1-7, wherein the instructions configure the processing circuitry to: determine that the ICN node has resources that satisfy the storage interest packet; create a second storage data packet that includes information about the ICN node; and transmit the second storage data packet in accordance with the PIT entry.

In Example 9, the subject matter of Example 8, wherein the instructions configure the processing circuitry to transmit, through an interface used to receive the storage interest packet, an interest packet for data identified in the storage interest packet.

In Example 10, the subject matter of any of Examples 1-9, wherein the instructions configure the processing circuitry to: determine that a node in a cluster has resources that satisfy the storage interest packet, the ICN node being part of the cluster; create a second storage data packet that includes information about the node in the cluster; and transmit the second storage data packet in accordance with the PIT entry.

In Example 11, the subject matter of Example 10, wherein the instructions configure the processing circuitry to communicate periodically with nodes in the cluster to obtain node information including the information about the node in the cluster.

In Example 12, the subject matter of Example 11, wherein the ICN node is a cluster head arranged to organize storage interest packets and storage data packets for the cluster.

In Example 13, the subject matter of any of Examples 1-12, wherein the ICN node is part of an ICN network, where the ICN node passed an attestation process to join the ICN network, wherein the attestation process includes: pledging the ICN network including providing attestation evidence; and being onboarded after a verifier of the ICN network receives endorsements or reference values of the attestation evidence from other nodes of the ICN network.

Example 14 is a method for storage node recruitment in an information centric network (ICN), the method comprising: receiving, at an ICN node, a storage interest packet, the storage interest including an indication differentiating the storage interest from other ICN interests; forwarding the storage interest packet; receiving a storage data packet in response to the storage interest packet, the storage data packet including an indication that the storage data packet is not to be cached, the storage data packet including node information for a node that created the storage data packet; and transmitting the storage data packet in accordance with a pending interest table (PIT) entry corresponding to the storage interest packet.

In Example 15, the subject matter of Example 14, wherein the storage interest packet includes a set of selectors, wherein the set of selectors is used by nodes to determine storage requirements for data indicated in the storage interest packet, and wherein the node that created the storage data packet met the storage requirements.

In Example 16, the subject matter of Example 15, wherein the set of selectors includes a platform requirement, security requirement, an integrity requirement, a storage requirement, or a transformation requirement.

In Example 17, the subject matter of Example 16, wherein the storage requirement restricts the data to a geographic area.

In Example 18, the subject matter of any of Examples 16-17, wherein the platform requirement enforces minimum performance of components.

In Example 19, the subject matter of any of Examples 16-18, wherein the transformation requirement defines which transformations to the data are acceptable during storage.

In Example 20, the subject matter of Example 19, wherein compression or encryption are transformations to the data.

In Example 21, the subject matter of any of Examples 14-20, comprising: determining that the ICN node has resources that satisfy the storage interest packet; creating a second storage data packet that includes information about the ICN node; and transmitting the second storage data packet in accordance with the PIT entry.

In Example 22, the subject matter of Example 21, comprising transmitting, through an interface used to receive the storage interest packet, an interest packet for data identified in the storage interest packet.

In Example 23, the subject matter of any of Examples 14-22, comprising: determining that a node in a cluster has resources that satisfy the storage interest packet, the ICN node being part of the cluster; creating a second storage data packet that includes information about the node in the cluster; and transmitting the second storage data packet in accordance with the PIT entry.

In Example 24, the subject matter of Example 23, comprising communicating periodically with nodes in the cluster to obtain node information including the information about the node in the cluster.

In Example 25, the subject matter of Example 24, wherein the ICN node is a cluster head arranged to organize storage interest packets and storage data packets for the cluster.

In Example 26, the subject matter of any of Examples 14-25, wherein the ICN node is part of an ICN network, where the ICN node passed an attestation process to join the ICN network, wherein the attestation process includes: pledging the ICN network including providing attestation evidence; and being onboarded after a verifier of the ICN network receives endorsements or reference values of the attestation evidence from other nodes of the ICN network.

Example 27 is at least one machine readable medium including instructions for storage node recruitment in an information centric network (ICN), the instructions, when executed by processing circuitry, cause the processing circuitry to perform operations comprising: receiving, at an ICN node, a storage interest packet, the storage interest including an indication differentiating the storage interest from other ICN interests; forwarding the storage interest packet; receiving a storage data packet in response to the storage interest packet, the storage data packet including an indication that the storage data packet is not to be cached, the storage data packet including node information for a node that created the storage data packet; and transmitting the storage data packet in accordance with a pending interest table (PIT) entry corresponding to the storage interest packet.

In Example 28, the subject matter of Example 27, wherein the storage interest packet includes a set of selectors, wherein the set of selectors is used by nodes to determine storage requirements for data indicated in the storage interest packet, and wherein the node that created the storage data packet met the storage requirements.

In Example 29, the subject matter of Example 28, wherein the set of selectors includes a platform requirement, security requirement, an integrity requirement, a storage requirement, or a transformation requirement.

In Example 30, the subject matter of Example 29, wherein the storage requirement restricts the data to a geographic area.

In Example 31, the subject matter of any of Examples 29-30, wherein the platform requirement enforces minimum performance of components.

In Example 32, the subject matter of any of Examples 29-31, wherein the transformation requirement defines which transformations to the data are acceptable during storage.

In Example 33, the subject matter of Example 32, wherein compression or encryption are transformations to the data.

In Example 34, the subject matter of any of Examples 27-33, wherein the operations comprise: determining that the ICN node has resources that satisfy the storage interest packet; creating a second storage data packet that includes information about the ICN node; and transmitting the second storage data packet in accordance with the PIT entry.

In Example 35, the subject matter of Example 34, wherein the operations comprise transmitting, through an interface used to receive the storage interest packet, an interest packet for data identified in the storage interest packet.

In Example 36, the subject matter of any of Examples 27-35, wherein the operations comprise: determining that a node in a cluster has resources that satisfy the storage interest packet, the ICN node being part of the cluster; creating a second storage data packet that includes information about the node in the cluster; and transmitting the second storage data packet in accordance with the PIT entry.

In Example 37, the subject matter of Example 36, wherein the operations comprise communicating periodically with nodes in the cluster to obtain node information including the information about the node in the cluster.

In Example 38, the subject matter of Example 37, wherein the ICN node is a cluster head arranged to organize storage interest packets and storage data packets for the cluster.

In Example 39, the subject matter of any of Examples 27-38, wherein the ICN node is part of an ICN network, where the ICN node passed an attestation process to join the ICN network, wherein the attestation process includes: pledging the ICN network including providing attestation evidence; and being onboarded after a verifier of the ICN network receives endorsements or reference values of the attestation evidence from other nodes of the ICN network.

Example 40 is a system for storage node recruitment in an information centric network (ICN), the system comprising: means for receiving, at an ICN node, a storage interest packet, the storage interest including an indication differentiating the storage interest from other ICN interests; means for forwarding the storage interest packet; means for receiving a storage data packet in response to the storage interest packet, the storage data packet including an indication that the storage data packet is not to be cached, the storage data packet including node information for a node that created the storage data packet; and means for transmitting the storage data packet in accordance with a pending interest table (PIT) entry corresponding to the storage interest packet.

In Example 41, the subject matter of Example 40, wherein the storage interest packet includes a set of selectors, wherein the set of selectors is used by nodes to determine storage requirements for data indicated in the storage interest packet, and wherein the node that created the storage data packet met the storage requirements.

In Example 42, the subject matter of Example 41, wherein the set of selectors includes a platform requirement, security requirement, an integrity requirement, a storage requirement, or a transformation requirement.

In Example 43, the subject matter of Example 42, wherein the storage requirement restricts the data to a geographic area.

In Example 44, the subject matter of any of Examples 42-43, wherein the platform requirement enforces minimum performance of components.

In Example 45, the subject matter of any of Examples 42-44, wherein the transformation requirement defines which transformations to the data are acceptable during storage.

In Example 46, the subject matter of Example 45, wherein compression or encryption are transformations to the data.

In Example 47, the subject matter of any of Examples 40-46, comprising: means for determining that the ICN node has resources that satisfy the storage interest packet; means for creating a second storage data packet that includes information about the ICN node; and means for transmitting the second storage data packet in accordance with the PIT entry.

In Example 48, the subject matter of Example 47, comprising means for transmitting, through an interface used to receive the storage interest packet, an interest packet for data identified in the storage interest packet.

In Example 49, the subject matter of any of Examples 40-48, comprising: means for determining that a node in a cluster has resources that satisfy the storage interest packet, the ICN node being part of the cluster; means for creating a second storage data packet that includes information about the node in the cluster; and means for transmitting the second storage data packet in accordance with the PIT entry.

In Example 50, the subject matter of Example 49, comprising means for communicating periodically with nodes in the cluster to obtain node information including the information about the node in the cluster.

In Example 51, the subject matter of Example 50, wherein the ICN node is a cluster head arranged to organize storage interest packets and storage data packets for the cluster.

In Example 52, the subject matter of any of Examples 40-51, wherein the ICN node is part of an ICN network, where the ICN node passed an attestation process to join the ICN network, wherein the attestation process includes: means for pledging the ICN network including providing attestation evidence; and means for being onboarded after a verifier of the ICN network receives endorsements or reference values of the attestation evidence from other nodes of the ICN network.

PNUMExample 53 is at least one machine-readable medium including instructions that, when executed by processing circuitry, cause the processing circuitry to perform operations to implement of any of Examples 1-52.

PNUMExample 54 is an apparatus comprising means to implement of any of Examples 1-52.

PNUMExample 55 is a system to implement of any of Examples 1-52.

PNUMExample 56 is a method to implement of any of Examples 1-52.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third,"

etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A node comprising:
  a memory including instructions; and
  processing circuitry that, when in operation, is configured by the instructions to:
    receive a storage interest packet, the storage interest packet including an indication differentiating the storage interest packet from other ICN interests;
    forward the storage interest packet;
    receive a storage data packet in response to the storage interest packet, the storage data packet including an indication that the storage data packet is not to be cached, the storage data packet including node information for a node that created the storage data packet, wherein the storage interest packet includes a set of selectors, wherein the set of selectors is used by nodes to determine storage requirements for data indicated in the storage interest packet, and wherein the node that created the storage data packet met the storage requirements; and
    transmit the storage data packet in accordance with a pending interest table (PIT) entry corresponding to the storage interest packet.

2. The node of claim 1, wherein the set of selectors includes a platform requirement, security requirement, an integrity requirement, a storage requirement, or a transformation requirement.

3. The node of claim 2, wherein the storage requirement restricts the data to a geographic area.

4. The node of claim 2, wherein the platform requirement enforces minimum performance of components.

5. The node of claim 2, wherein the transformation requirement defines which transformations to the data are acceptable during storage.

6. The node of claim 5, wherein compression or encryption are transformations to the data.

7. The node of claim 1, wherein the instructions configure the processing circuitry to:
  determine that the node has resources that satisfy the storage interest packet;
  create a second storage data packet that includes information about the node; and
  transmit the second storage data packet in accordance with the PIT entry.

8. The node of claim 7, wherein the instructions configure the processing circuitry to transmit, through an interface used to receive the storage interest packet, an interest packet for data identified in the storage interest packet.

9. The node of claim 1, wherein the instructions configure the processing circuitry to:
  determine that a second node in a cluster has resources that satisfy the storage interest packet, the node being part of the cluster;
  create a second storage data packet that includes information about the second node in the cluster; and
  transmit the second storage data packet in accordance with the PIT entry.

10. The node of claim 9, wherein the instructions configure the processing circuitry to communicate periodically with nodes in the cluster to obtain node information including the information about the node in the cluster.

11. At least one non-transitory machine readable medium including instructions that, when executed by processing circuitry, cause the processing circuitry to perform operations comprising:
  receiving, at an information centric network (ICN) node, a storage interest packet, the storage interest packet including an indication differentiating the storage interest packet from other ICN interests;
  forwarding the storage interest packet;
  receiving a storage data packet in response to the storage interest packet, the storage data packet including an indication that the storage data packet is not to be cached, the storage data packet including node information for a node that created the storage data packet, wherein the storage interest packet includes a set of selectors, wherein the set of selectors is used by nodes to determine storage requirements for data indicated in the storage interest packet, and wherein the node that created the storage data packet met the storage requirements; and
  transmitting the storage data packet in accordance with a pending interest table (PIT) entry corresponding to the storage interest packet.

12. The at least one non-transitory machine readable medium of claim 11, wherein the set of selectors includes a platform requirement, security requirement, an integrity requirement, a storage requirement, or a transformation requirement.

13. The at least one non-transitory machine readable medium of claim 12, wherein the storage requirement restricts the data to a geographic area.

14. The at least one non-transitory machine readable medium of claim 12, wherein the platform requirement enforces minimum performance of components.

15. The at least one non-transitory machine readable medium of claim 12, wherein the transformation requirement defines which transformations to the data are acceptable during storage.

16. The at least one non-transitory machine readable medium of claim 15, wherein compression or encryption are transformations to the data.

17. The at least one non-transitory machine readable medium of claim 11, wherein the operations comprise:
  determining that the ICN node has resources that satisfy the storage interest packet;
  creating a second storage data packet that includes information about the ICN node; and
  transmitting the second storage data packet in accordance with the PIT entry.

18. The at least one non-transitory machine readable medium of claim 17, wherein the operations comprise transmitting, through an interface used to receive the storage interest packet, an interest packet for data identified in the storage interest packet.

19. The at least one non-transitory machine readable medium of claim 11, wherein the operations comprise:
determining that a node in a cluster has resources that satisfy the storage interest packet, the ICN node being part of the cluster;
creating a second storage data packet that includes information about the node in the cluster; and
transmitting the second storage data packet in accordance with the PIT entry.

20. The at least one non-transitory machine readable medium of claim 19, wherein the operations comprise communicating periodically with nodes in the cluster to obtain node information including the information about the node in the cluster.

21. The at least one non-transitory machine readable medium of claim 20, wherein the ICN node is a cluster head arranged to organize storage interest packets and storage data packets for the cluster.

22. The at least one non-transitory machine readable medium of claim 11, wherein the ICN node is part of an ICN network, where the ICN node passed an attestation process to join the ICN network, wherein the attestation process includes:
pledging the ICN network including providing attestation evidence; and
being onboarded after a verifier of the ICN network receives endorsements or reference values of the attestation evidence from other nodes of the ICN network.

23. A method comprising:
receiving, at an information centric network (ICN) node, a storage interest packet, the storage interest packet including an indication differentiating the storage interest packet from other ICN interests;
forwarding the storage interest packet;
receiving a storage data packet in response to the storage interest packet, the storage data packet including an indication that the storage data packet is not to be cached, the storage data packet including node information for a node that created the storage data packet, wherein the storage interest packet includes a set of selectors, wherein the set of selectors is used by nodes to determine storage requirements for data indicated in the storage interest packet, and wherein the node that created the storage data packet met the storage requirements; and
transmitting the storage data packet in accordance with a pending interest table (PIT) entry corresponding to the storage interest packet.

24. The method of claim 23, comprising:
determining that the ICN node has resources that satisfy the storage interest packet;
creating a second storage data packet that includes information about the ICN node; and
transmitting the second storage data packet in accordance with the PIT entry.

25. The method of claim 24, wherein the operations comprise transmitting, through an interface used to receive the storage interest packet, an interest packet for data identified in the storage interest packet.

26. The method of claim 23, wherein the set of selectors includes a platform requirement, security requirement, an integrity requirement, a storage requirement, or a transformation requirement.

27. The method of claim 26, wherein the transformation requirement defines which transformations to the data are acceptable during storage, and wherein compression or encryption are transformations to the data.

28. The method of claim 23, comprising:
determining that a node in a cluster has resources that satisfy the storage interest packet, the ICN node being part of the cluster;
creating a second storage data packet that includes information about the node in the cluster; and
transmitting the second storage data packet in accordance with the PIT entry.

* * * * *